United States Patent
Kim et al.

(10) Patent No.: US 9,813,093 B2
(45) Date of Patent: Nov. 7, 2017

(54) BROADCAST SIGNAL RECEIVING APPARATUS AND MULTI-LAYER PRINTED CIRCUIT BOARD

(71) Applicant: SAMSUNG ELECTRONICS CO., LTD., Suwon-si (KR)

(72) Inventors: Hyun-Jun Kim, Seoul (KR); Sung-soo Lee, Suwon-si (KR); Hwan-sun Hong, Suwon-si (KR); Ja-hun Lee, Hwaseong-si (KR); Cheol-hee Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/179,157

(22) Filed: Jun. 10, 2016

(65) Prior Publication Data
US 2016/0365882 A1    Dec. 15, 2016

(30) Foreign Application Priority Data

Jun. 10, 2015    (KR) .................. 10-2015-0082024

(51) Int. Cl.
*H04B 1/10*    (2006.01)
*H04B 1/16*    (2006.01)

(52) U.S. Cl.
CPC .............. *H04B 1/109* (2013.01); *H04B 1/16* (2013.01)

(58) Field of Classification Search
None
See application file for complete search history.

(56) References Cited

U.S. PATENT DOCUMENTS

| | | | |
|---|---|---|---|
| 9,413,410 B2* | 8/2016 | You | H04B 15/00 |
| 2010/0172527 A1 | 7/2010 | Zhu et al. | |
| 2011/0172002 A1 | 7/2011 | Zhu et al. | |
| 2013/0107128 A1* | 5/2013 | Seo | H04N 5/455 348/731 |
| 2014/0308906 A1 | 10/2014 | Saji et al. | |
| 2015/0171814 A1* | 6/2015 | Pai | H04B 1/16 455/241.1 |

FOREIGN PATENT DOCUMENTS

| | | |
|---|---|---|
| JP | 2014-207517 A | 10/2014 |
| KR | 10-2005-0060705 A | 6/2005 |

* cited by examiner

*Primary Examiner* — David Bilodeau
(74) *Attorney, Agent, or Firm* — Sughrue Mion, PLLC

(57) ABSTRACT

A broadcast signal receiving apparatus, including a multi-layer printed circuit board comprising a transmission line configured to connect with at least one component mounted on the multi-layer printed circuit board, the at least one component being configured to process a broadcast signal received from an outside of the apparatus through a cable, wherein a signal line for receiving the broadcast signal is at least partially provided on an inner layer of the multi-layer printed circuit board.

18 Claims, 18 Drawing Sheets

BROADCAST SIGNAL RECEIVING APPARATUS AND MULTI-LAYER PRINTED CIRCUIT BOARD

CROSS-REFERENCE TO RELATED APPLICATION

This application claims priority from Korean Patent Application No. 10-2015-0082024, filed on Jun. 10, 2015 in the Korean Intellectual Property Office, the disclosure of which is incorporated herein by reference in its entirety.

BACKGROUND

Field

Apparatuses and methods consistent with the exemplary embodiments relate to a broadcast signal receiving apparatus and a multi-layer printed circuit board included in the same, and more particularly to a broadcast signal receiving apparatus for receiving a broadcast signal from the exterior and a multi-layer printed circuit board included in the same.

Description of Related Art

A broadcast signal receiving apparatus receives satellite, cable and terrestrial broadcast signals and process them to be displayed as images. The broadcast signal receiving apparatus may display the processed broadcast signal as an image on its own display panel or may output the processed broadcast signal to another display apparatus having a panel so that the broadcast signal can be displayed as an image on the panel. As an example of the former, there is a television that is also called a display apparatus. As an example of the latter, there is a set-top box.

The broadcast signal receiving apparatus may receive a broadcast signal in various ways. For example, the broadcast signal receiving apparatus may receive a broadcast signal through a cable directly connected to broadcasting equipment of a broadcasting station, or may wirelessly receive a broadcast signal in the form of a radio frequency (RF) signal through an RF antenna to which the broadcast signal receiving apparatus is connected by a wire. Further, the broadcast signal receiving apparatus may receive a broadcast signal through a satellite antenna.

With recent expansion of use of various digital devices, a frequency of a broadcast signal received in the broadcast signal receiving apparatus is often overlapped with a frequency band of another apparatus. For example, cable broadcasting uses a wired frequency band of 54 MHz to 1002 MHz, which overlaps with a wireless frequency band of 8 xxMHz to 9 xxMHz employed for code division multiple access (CDMA), global system for mobile communication (GSM), long term evolution (LTE), etc. In such a band where the frequencies overlap each other, there may be interference between signals.

If the frequency of the broadcast signal overlaps with an external interference frequency, the reception sensitivity of the broadcast signal becomes poor and thus image/sound qualities are deteriorated. In addition, the poor reception sensitivity may cause problems of suddenly stopping an image or making reception be not available.

SUMMARY

According to an aspect of an exemplary embodiment, there is provided a broadcast signal receiving apparatus including: a multi-layer printed circuit board configured to be mounted with at least one component for processing a broadcast signal received from an outside through a cable, and include a transmission line for connecting the components, wherein a signal line for receiving the broadcast signal may be at least partially provided on an inner layer of the multi-layer printed circuit board. Thus, the input entrance for the broadcast signal is provided on the inner layer without wastefully increasing material costs, so that the outer layer and the inner layer where the signal line is not provided can have an effect on shielding an external interference signal.

Impedance of the inner layer where the signal line is provided may have a predetermined reference value determined to decrease distortion of the broadcast signal due to interference with an external signal having a frequency band overlapped with a frequency band of the broadcast signal. Thus, it is possible to prevent the broadcast signal from being distorted due to the interference signal using the frequency band overlapped with that of the broadcast signal.

The reference value may be determined so that a magnitude of a predetermined parameter measured in the multi-layer printed circuit board designed to have impedance corresponding to the reference value can satisfy regulations at a predetermined frequency band. Thus, it is possible to manufacture a product satisfying requirements of a broadcast operator.

The signal line may be formed as a pattern on the inner layer of the multi-layer printed circuit board, and a thickness of the pattern and each of distances between the pattern and both ground surfaces may be designed so that the inner layer having the signal line can have the impedance corresponding to the reference value. Thus, a method of designing a pattern of a strip line is enough to get proper impedance matching.

The multi-layer printed circuit board may have a multi-layered structure including first to fourth layers, and the signal line corresponding to a signal input portion may be provided on one of second and third layers of the multi-layer printed circuit board. Thus, there are no limits to the inner layer design, and improvement in performance based on various inner layer designs will be expected.

The multi-layer printed circuit board may have a multi-layered structure including first to sixth layers, and the signal line corresponding to the signal input portion may be provided on one of second and fourth layers of the multi-layer printed circuit board. Thus, exemplary embodiments are applicable to various multi-layer printed circuit boards without limitation to the number of PCB layers.

The signal line provided on the inner layer may be shielded from an external interference signal by the outer layer and the inner layer where the signal line is not provided in the multi-layer printed circuit board. Thus, it is possible to shield the interference signal without any mechanical shield required in the conventional outer layer design.

The broadcast signal receiving may further include: a filter configured to filter the broadcast signal received from the outside through the cable; and a low noise amplifier configured to amplify the filtered broadcast signal, and the broadcast signal passed through the filter may be input to the low noise amplifier through the signal line provided on the inner layer. Thus, the signal input portion can receive the broadcast signal without distortion, and it is possible to decrease an error while processing the broadcast signal.

The inner layer where the signal line is provided may include a ground layer or a power layer. Thus, there are no limits to the kind of inner layer where the signal line is provided.

According to another aspect of an exemplary embodiment, there is provided a multi-layer printed circuit board placed inside a broadcast signal receiving apparatus, the multi-layer printed circuit board configured to be mounted with on a topmost layer thereof at least one component for processing a broadcast signal received from an outside through a cable, and include a transmission line for connecting the components, a signal line for receiving the broadcast signal is at least partially provided on an inner layer of the multi-layer printed circuit board. Thus, the input entrance for the broadcast signal is provided on the inner layer without wastefully increasing material costs, so that the outer layer and the inner layer where the signal line is not provided can have an effect on shielding an external interference signal.

Impedance of the inner layer where the signal line is provided may have a predetermined reference value determined to decrease distortion of the broadcast signal due to interference with an external signal having a frequency band overlapped with a frequency band of the broadcast signal. Thus, it is possible to prevent the broadcast signal from being distorted due to the interference signal using the frequency band overlapped with that of the broadcast signal.

The reference value may be determined so that a magnitude of a predetermined parameter measured in the multi-layer printed circuit board designed to have impedance corresponding to the reference value can satisfy regulations at a predetermined frequency band. Thus, it is possible to manufacture a product satisfying requirements of a broadcast operator.

The signal line may be formed as a pattern on the inner layer of the multi-layer printed circuit board, and a thickness of the pattern and each of distances between the pattern and both ground surfaces may be designed so that the inner layer having the signal line can have the impedance corresponding to the reference value. Thus, a method of designing a pattern of a strip line is enough to get proper impedance matching.

The multi-layer printed circuit board may have a multi-layered structure including first to fourth layers, and the signal line corresponding to a signal input portion may be provided on one of second and third layers of the multi-layer printed circuit board. Thus, there are no limits to the inner layer design, and improvement in performance based on various inner layer designs will be expected.

The multi-layer printed circuit board may have a multi-layered structure including first to sixth layers, and the signal line corresponding to the signal input portion may be provided on one of second and fourth layers of the multi-layer printed circuit board. Thus, exemplary embodiments applicable to various multi-layer printed circuit boards without limitation to the number of PCB layers.

The signal line provided on the inner layer may be shielded from an external interference signal by the outer layer and the inner layer where the signal line is not provided in the multi-layer printed circuit board. Thus, it is possible to shield the interference signal without any mechanical shield required in the conventional outer layer design.

The multi-layer printed circuit board may further include: a filter configured to filter the broadcast signal received from the outside through the cable; and a low noise amplifier configured to amplify the filtered broadcast signal, and the broadcast signal passed through the filter may be input to the low noise amplifier through the signal line provided on the inner layer. Thus, the signal input portion can receive the broadcast signal without distortion, and it is possible to decrease an error while processing the broadcast signal.

The inner layer where the signal line is provided may include a ground layer or a power layer. Thus, there are no limits to the kind of inner layer where the signal line is provided.

According to an aspect of an exemplary embodiment, a broadcast signal receiving apparatus includes a multi-layer printed circuit board comprising a transmission line configured to connect with at least one component mounted on the multi-layer printed circuit board, the at least one component being configured to process a broadcast signal received from an outside of the apparatus through a cable, wherein a signal line for receiving the broadcast signal is at least partially provided on an inner layer of the multi-layer printed circuit board.

An impedance of the inner layer where the signal line is provided may be a predetermined reference value configured to decrease distortion of the broadcast signal due to interference with an external signal having a frequency band overlapped with a frequency band of the broadcast signal.

The reference value may be determined so that a magnitude of a predetermined parameter measured in the multi-layer printed circuit board configured to have impedance corresponding to the reference value satisfies regulations at a predetermined frequency band.

The signal line may be formed as a pattern on the inner layer of the multi-layer printed circuit board, and a thickness of the pattern and a distance between the pattern and both ground surfaces may be configured so that the impedance of the inner layer corresponds to the reference value.

The multi-layer printed circuit board may be configured to have a multi-layered structure comprising first to fourth layers, and the signal line corresponding to a signal input portion may be provided on one from among a second layer and a third layer of the multi-layer printed circuit board.

The multi-layer printed circuit board may be configured to have a multi-layered structure comprising first to sixth layers, and the signal line corresponding to the signal input portion may be provided on one from among a second layer and a fourth layer of the multi-layer printed circuit board.

The signal line may be shielded from an external interference signal by the outer layer and by a portion of the inner layer where the signal line is not provided.

The broadcast signal receiving apparatus according to claim 1 may further include a filter configured to filter the broadcast signal received from the outside of the apparatus through the cable; and a low noise amplifier configured to amplify the filtered broadcast signal, wherein the filtered broadcast signal is input to the low noise amplifier through the signal line provided on the inner layer.

The inner layer can include one from among a ground layer or a power layer.

According to another aspect of an exemplary embodiment, a multi-layer printed circuit board inside a broadcast signal receiving apparatus includes a transmission line configured to connect with at least one component mounted on a topmost layer of the multi-layer printed circuit board, the at least one component being configured to process a broadcast signal received from an outside of the apparatus through a cable, wherein a signal line for receiving the broadcast signal may be at least partially provided on an inner layer of the multi-layer printed circuit board.

An impedance of the inner layer where the signal line is provided may have a predetermined reference value configured to decrease distortion of the broadcast signal due to interference with an external signal having a frequency band overlapped with a frequency band of the broadcast signal.

The reference value may be determined so that a magnitude of a predetermined parameter measured in the multi-layer printed circuit board configured to have impedance corresponding to the reference value satisfies regulations at a predetermined frequency band.

The signal line may be formed as a pattern on the inner layer of the multi-layer printed circuit board, and a thickness of the pattern and each of a distance between the pattern and both ground surfaces are configured so that the impedance of inner layer corresponds to the reference value.

The multi-layer printed circuit board may be configured to have a multi-layered structure comprising first to fourth layers, and the signal line corresponding to a signal input portion may be provided on one from among second layer and a third layer of the multi-layer printed circuit board.

The multi-layer printed circuit board may be configured to have a multi-layered structure comprising first to sixth layers, and the signal line corresponding to the signal input portion may be provided on one from among a second layer and a fourth layer of the multi-layer printed circuit board.

The signal line may be shielded from an external interference signal by the outer layer and by a portion of the inner layer where the signal line is not provided.

The multi-layer printed circuit board may further include a filter configured to filter the broadcast signal received from the outside of the apparatus through the cable; and a low noise amplifier configured to amplify the filtered broadcast signal, wherein the filtered broadcast signal may be input to the low noise amplifier through the signal line provided on the inner layer.

The inner layer can include one from among a ground layer or a power layer.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION

Below, exemplary embodiments will be described with reference to accompanying drawings to such an extent as to be easily realized by a person having an ordinary knowledge in the art. The present inventive concept is not limited to the exemplary embodiments set forth herein, and may be materialized variously. For clarity, elements not directly related to the elements of the exemplary embodiment may be omitted, and like numerals refer to like elements throughout. In the following descriptions, terms such as "include" or "have" refer to presence of features, numbers, steps, operations, elements or combination thereof, and do not exclude presence or addition of one or more other features, numbers, steps, operations, elements or combination thereof.

Figure 1:
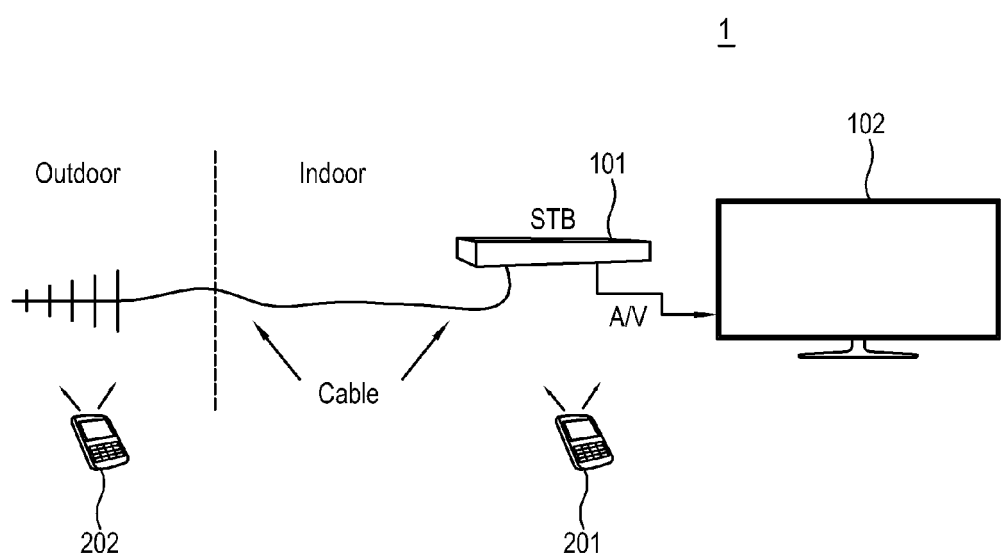
FIG. 1 and FIG. 2 schematically illustrate a broadcast signal receiving system according to an exemplary embodiment.
Figure 2:
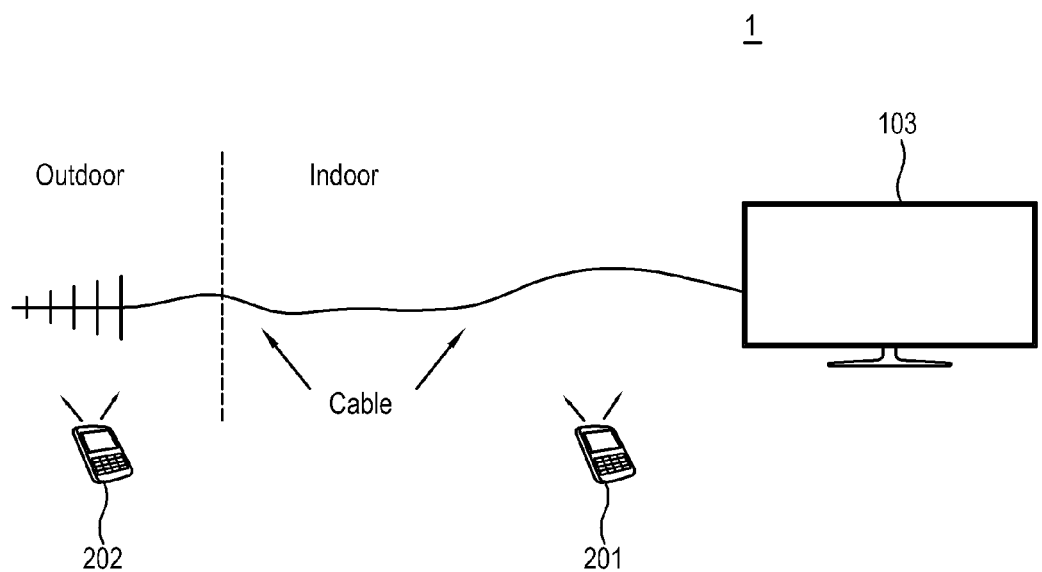

FIG. 1 and FIG. 2 schematically illustrate a broadcast signal receiving system 1 according to an exemplary embodiment;

As shown in FIG. 1 and FIG. 2, the broadcast signal receiving system 1 according to an exemplary embodiment includes a broadcast signal receiving apparatus 101, 103 for receiving and processing a broadcast signal, and an external apparatus 201, 202 using a frequency band to be interfered with a receiving frequency of the broadcast signal receiving apparatus 101, 103.

Referring to FIG. 1, the broadcast signal receiving apparatus 101 according to an exemplary embodiment may be achieved by a set-top box (STB) capable of receiving and processing a broadcast signal, and output a video/audio signal to a display apparatus 102 such as a TV. FIG. 1 illustrates that the broadcast signal receiving apparatus 101 is the set-top box, but not limited thereto. Alternatively, the broadcast signal receiving apparatus 101 may be achieved by various kinds of display apparatuses including a TV 103 as shown in FIG. 2.

The broadcast signal receiving apparatus 101, 103 receives a broadcast signal from a broadcasting station and the like signal source, i.e. from a headend. The broadcast signal receiving apparatus 101, 103 according to an exemplary embodiment may receive a broadcast signal through a cable, i.e. a coaxial cable.

The broadcast signal receiving apparatus 101, 103 processes the received broadcast signal to be displayed as an image. If the broadcast signal receiving apparatus 101 is the set-top box, the processed video signal is output to and thus displayed in a separate display apparatus 102. On the other hand, if the broadcast signal receiving apparatus 103 is a television, it can display a broadcast image by itself.

To this end, the broadcast signal receiving apparatus 101, 103 according to an exemplary embodiment is internally mounted with at least one component for processing a broadcast signal received from the outside through a cable, and includes a printed circuit board (PCB) formed with transmission lines for electrically connecting the mounted components. Here, the printed circuit board may for example be achieved by a multi-layer printed circuit board having a multi-layer structure of the first to fourth layers.

This exemplary embodiment shows that the broadcast signal receiving apparatus 101, 103 processes a broadcast signal based on a broadcast signal/broadcast information/broadcast data received from a signal source. However, the kind of image signal to be processed in the broadcast signal receiving apparatus 101, 103 is not limited to the broadcast signal. For example, the broadcast signal receiving apparatus 101, 103 may receive a signal from various external apparatuses, e.g. a smart phone, a smart pad such as a tablet personal computer (PC), a mobile device including an MP3 player, a PC such as a desktop computer or a laptop computer, etc. through a wire or wireless communication. Further, the broadcast signal receiving apparatus 101, 103 may process a signal so that the display apparatus 102, 103 such as the television can display a moving image, a still image, an application, an on-screen display (OSD), a user interface (UI or also called a graphic user interface (GUI)) for controlling various operations, etc. based on signal/data stored in an internal/external storage medium.

The broadcast signal received in the broadcast signal receiving apparatus 101, 103 is a broadcast signal of a terrestrial wave, etc., which can be received through a cable, the image source in this exemplary embodiment is not limited to the broadcasting station. That is, the image source may include any device or station as long as it can transmit and receive information.

In this exemplary embodiment shown in FIG. 1 and FIG. 2, the display apparatus 101, 103 may be achieved by a Smart TV or an Internet Protocol (IP) TV. The Smart TV can receive and display a broadcast signal in real time, and has a web browsing function so that the broadcast signal can be displayed in real time and at the same time various contents can be searched and consumed through Internet. To this end, the Smart TV provides an interface convenient for a user. Further, the Smart TV includes an open software platform in order to provide an interactive service to a user. Therefore, the Smart TV may provide a user with an application that offers various contents, e.g., a predetermined service to a user through the open software platform. Such an application is an application program capable of providing various kinds of service. For example, the application includes applications for social network service (SNS), finance, news, weather, a map, music, movie, a game, an electronic book, etc.

In the exemplary embodiment of FIG. 1, the display apparatus 102 may further receive video on demand (VOD) or the like service from a service provider through the broadcast signal receiving apparatus 101, i.e. the set-top box. Further, the broadcast signal receiving apparatus 103 may be a monitor or the like connected to a computer.

In other words, the following exemplary embodiments to be described later are just examples that may vary depending on the systems, and thus do not limit the scope of the invention.

As shown in FIG. 1 and FIG. 2, the broadcast signal receiving apparatus 101, 103 according to an exemplary embodiment receives a broadcast signal through a cable, and the broadcast signal received in this manner is interfered with a signal transmitted and received by another indoor or outdoor apparatus 201, 202, for example, a handset, i.e. a terminal using a wireless frequency band such as a code division multiple access (CDMA), global system/standard for mobile communication (GSM), long term evolution (LTE), etc.

The RF immunity test defined in the electromagnetic susceptibility (EMS) item of the electromagnetic compatibility (EMC) standards is related to a case where a receiving frequency and an interference frequency are different from each other. Thus, it is possible to pass the EMS standards without any special countermeasures.

By the way, the frequency band may be overlapped between a transmitter and a receiver, which are different from each other, as utilization of frequency has recently become widespread. For example, cable broadcasting uses a wired frequency band of 54 MHz to 1002 MHz, which overlaps with a wireless frequency band of 8 xxMHz to 9 xxMHz employed for code division multiple access (CDMA), global system for mobile communication (GSM), long term evolution (LTE), etc.

Of course, there may be difference between frequency bands according to nations. However, regardless of such difference between nations, most of frequency bands are overlapped and thus interfered with each other if wireless and wire transmission methods are used together.

Figure 3:
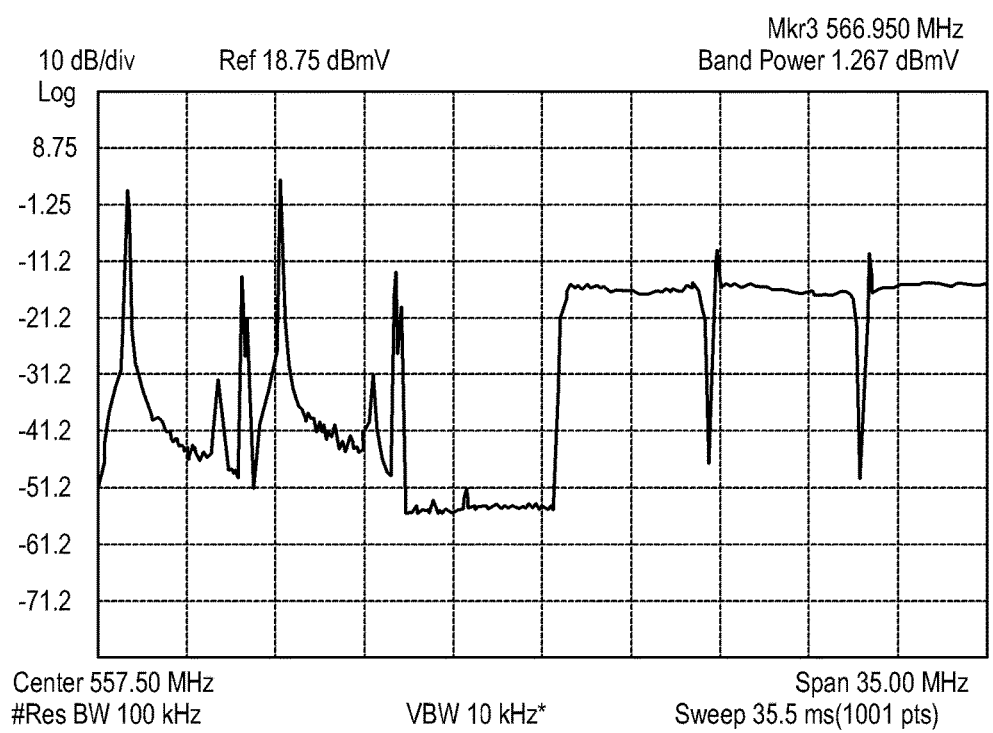
FIG. 3 shows a frequency spectrum of a wired broadcast signal received in the broadcast signal receiving apparatus according to an exemplary embodiment.
Figure 4:
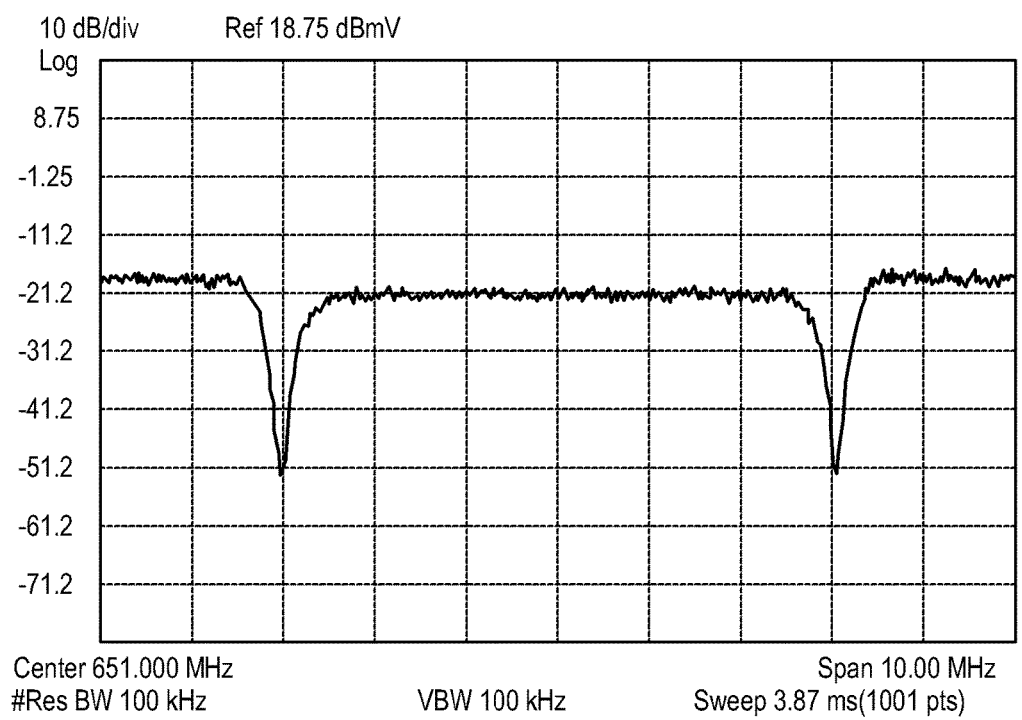
FIG. 4 illustrates a waveform of a broadcast signal received normally, according to an exemplary embodiment.
Figure 5:
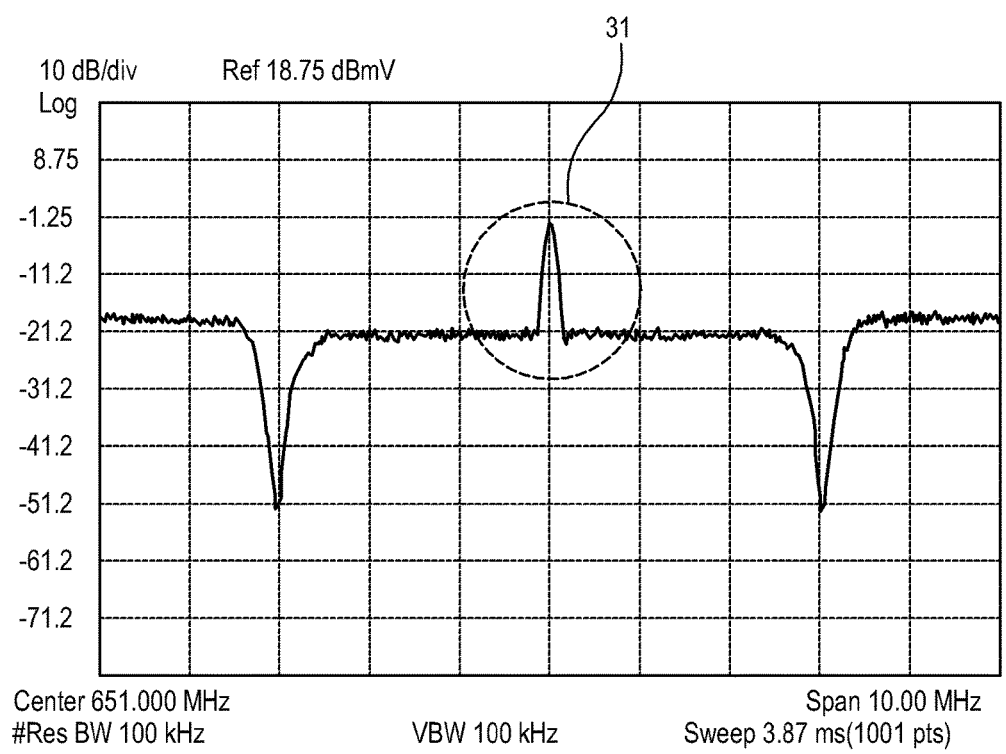
FIG. 5 illustrates a waveform of a broadcast signal received with interference, according to an exemplary embodiment.

FIG. 3 shows a frequency spectrum of a wired broadcast signal received in the broadcast signal receiving apparatus according to an exemplary embodiment, FIG. 4 illustrates a waveform of a broadcast signal received normally, and FIG. 5 illustrates a waveform of a broadcast signal received with interference.

Referring to FIG. 5, if there is interference with the transmitting/receiving signal of the external apparatus 201, 202, an overlap 31 is caused by an interference frequency on the contrary to that of FIG. 4.

Accordingly, cable operators, for example, 'COMCAST' in the US, 'VIDEOTRON' in Canada, 'VERGIN MEDIA' in the UK, 'UPC' in the Netherlands, and the like, which uses the broadcast signal receiving apparatus such as the set-top box to provide a broadcasting service, has requested manufacturers for the broadcast signal receiving apparatus to satisfy the standards about wireless frequency interference.

In the broadcast signal receiving apparatus 101, 103 according to an exemplary embodiment, a signal line for transmitting a broadcast signal is at least partially provided in an inner layer of the multi-layer printed circuit board 500 (see FIG. 7) placed inside the apparatus 101, 103. As the signal lines are provided in the inner layer, they are shielded by the PCB outer layer from an external interference signal, details of which will be described later.

Below, details of the broadcast signal receiving apparatus according to an exemplary embodiment will be described with reference to FIG. 6.

Figure 6:
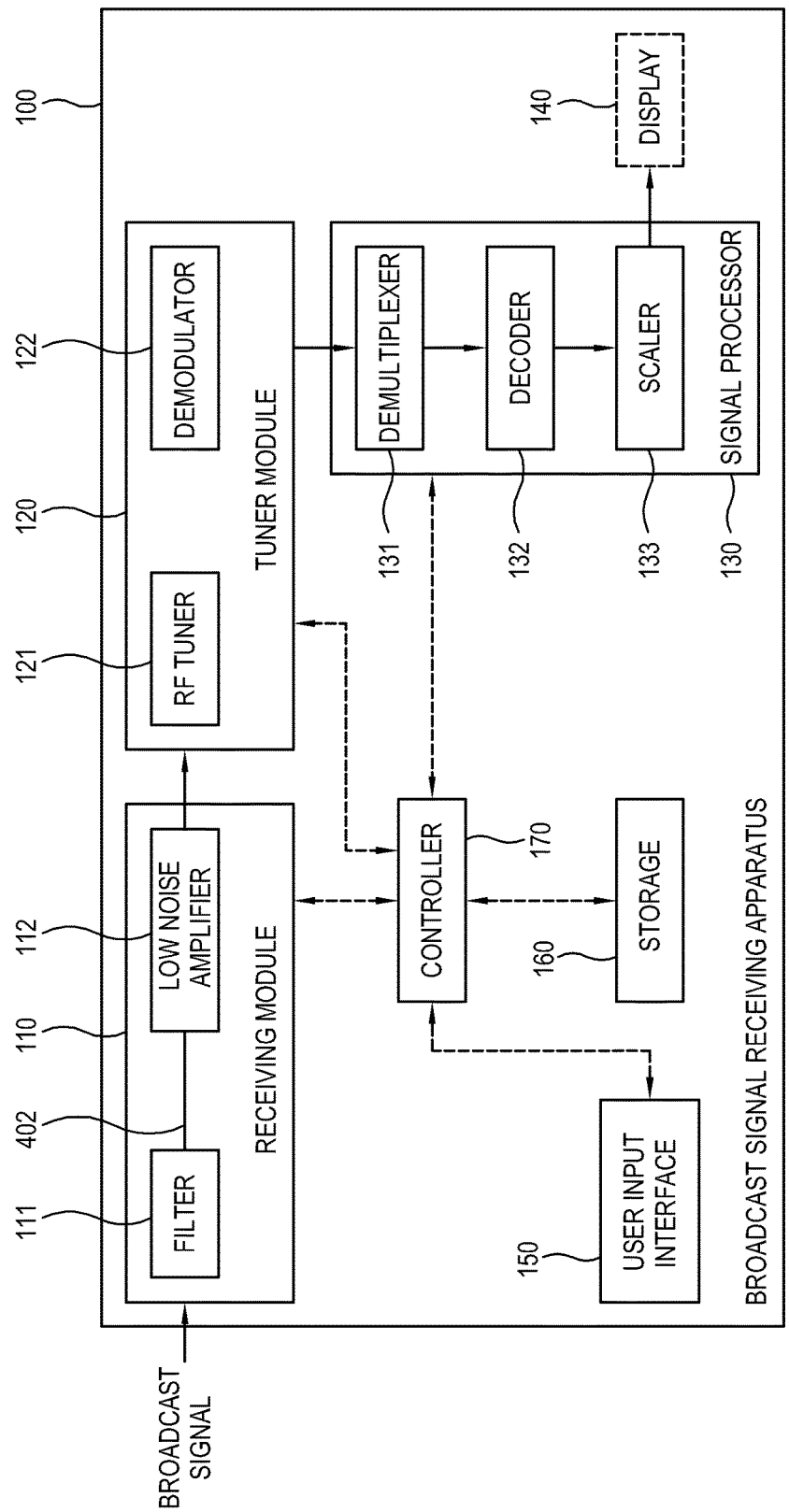
FIG. 6 is a block diagram of the broadcast signal receiving apparatus according to an exemplary embodiment.

FIG. 6 is a block diagram showing a broadcast signal receiving apparatus 100 according to an exemplary embodiment. The broadcast signal receiving apparatus 100 shown in FIG. 6 is substantially the same as the broadcast signal receiving apparatuses 101 and 103 shown in FIG. 1 and FIG. 2, and thus applicable to the broadcast signal receiving apparatuses 101 and 103 shown in FIG. 1 and FIG. 2.

As shown in FIG. 6, the broadcast signal receiving apparatus 100 according to an exemplary embodiment includes a receiving module 110 for receiving a broadcast signal from a signal source, a tuner module 120 for being tuned to a certain channel among the channels of the received broadcast signal, a signal processor 130 for processing the broadcast signal received from the tuner module 120 to be displayed as an image, a display 140 for displaying an image based on the broadcast signal processed by the signal processor 130, a user input interface 150 for receiving a user's input, a storage 160 for storing various pieces of data, and a controller 170 for controlling the broadcast signal receiving apparatus 100.

Here, the receiving module 110, the tuner module 120, the signal processor 130 and the controller 170 are components for processing a broadcast signal, for example, chips (or an integrated circuit (IC) chip), which can be mounted to the multi-layer printed circuit board 500 according to an exemplary embodiment.

The broadcast signal receiving apparatus 100 may receive a broadcast signal in various methods according to the formats of the broadcast signal and the types of the apparatus 100.

According to an exemplary embodiment, the broadcast signal receiving apparatus 100 supports wired or wireless communication, and may for example include a cable, i.e. a coaxial cable to be connected to a signal source of a broadcasting station, a cable operator, etc. and receive a video/audio/data signal as the broadcast signal.

Here, a cable terminal for receiving the broadcast signal may be connected and coupled to an input terminal of the receiving module 110 mounted to the printed circuit board 500. The broadcast signal receiving apparatus 100 receives a broadcast signal from the signal source through a cable. Alternatively, the broadcast signal receiving apparatus 100 may exchange information with a broadcast operator, e.g., a service provider through interactive communication.

The broadcast signal receiving apparatus 100 may further receive a video signal based on standards such as composite video, component video, super video, SCART, high definition multimedia interface (HDMI), or the like through a cable. Further, the video signal may be received from an external apparatus. For example, the video signal may be received from the external apparatus such as a personal computer (PC), an audio/video (AV) device, a smart phone, a smart pad (or a tablet PC), etc. Further, the broadcast signal receiving apparatus 100 may wirelessly receive an RF signal from the broadcasting station or the like signal source through an antenna ANT.

Further, the video signal may be based on data received through Internet or the like network. In this case, the broadcast signal receiving apparatus 100 may be provided with a network communication module for performing data communication with the exterior. For example, the broadcast signal receiving apparatus 100 may support at least one of communication interfaces 1 to N such as a wired local area network (LAN), Bluetooth, Wi-fi Direct, radio frequency (RF), Zigbee, a wireless LAN, Wi-fi, infrared communication, ultra wideband (UWB), near field communication (NFC), etc.

The communication module may be placed inside the broadcast signal receiving apparatus 100, or may be achieved in the form of a dongle and detachably connected to a connector of the broadcast signal receiving apparatus 100.

Further, a video signal may be data stored in a nonvolatile storage 160 such as a flash memory, a hard disk drive, etc. The storage 160 may be placed inside or outside the broadcast signal receiving apparatus 100. In the case where the storage 160 is placed at the outside, the broadcast signal receiving apparatus 100 may further include a connector to which the storage 160 is connected.

In this exemplary embodiment, it will be described below by way of example that the broadcast signal receiving apparatus 100 receives audio/video contents, i.e. an RF signal from the signal source through a cable. Alternatively, the broadcast signal receiving apparatus 100 may wirelessly receive the RF signal from the signal source through the antenna ANT.

As shown in FIG. 6, the receiving module 110 includes a filter 111 for filtering the broadcast signal received through a cable, and a low noise amplifier (LNA) 112 for amplifying the filtered RF signal to minimize a noise.

The filter 111 performs filtering to pass only a desired frequency band of the RF signal in an input high-frequency broadcast signal. The filter 111 has an input terminal connected to the cable terminal through which the broadcast signal is received, and it is thus possible to receive the high frequency broadcast signal.

According to an exemplary embodiment, the filter 111 is provided to divide a plurality of frequency bands. For example, the filter 111 may be achieved by a triplexer for dividing a frequency band into three, but not limited thereto. Alternatively, the filter 111 in the broadcast signal receiving apparatus 100 according to an exemplary embodiment may be achieved by connecting two or more filters in series to sequentially filter the signal. In some exemplary embodiments, a single filter may be provided.

The low noise amplifier 112 makes the high frequency RF signal passed through the filter 111 be subject to low-noise amplification, and then outputs the amplified signal to the tuner module 120. The low noise amplifier 112 amplifies only a signal component of the RF broadcast signal while minimizing a noise component.

Here, the filter 111 and the low noise amplifier 112 are mounted on to the multi-layer printed circuit board 500 as components for processing the broadcast signal, and connected to each other by a signal line 402 for delivering the broadcast signal. The signal line 402 is a signal input portion to which a broadcast signal is input, i.e. corresponds to an entrance of an input signal.

In the multi-layer printed circuit board 500 according to an exemplary embodiment, the signal line 402 corresponding to the signal input portion is achieved by a strip line installed at an inner layer of the multi-layer printed circuit board. The strip line is given in the form of a transmission line where a narrow conductive circuit keeps equal distance from and parallel with two flat ground planes.

The tuner module 120 includes an RF tuner 121 and a demodulator 122.

In this exemplary embodiment, the RF tuner 121 receives a broadcast signal, i.e. an RF signal from the satellite 300 through the relay 200 by a wire.

The RF tuner 121 receives a radio frequency (RF) signal amplified to have low noise from the low noise amplifier 112.

The RF tuner 121 may be tuned to a certain channel among the channels of the broadcast signals. The RF tuner 121 may for example be achieved by an RF IC that including a mixer, a phase locked loop (PPL) and an oscillator.

In this exemplary embodiment, the RF tuner 121 mixes a broadcast signal with an oscillation frequency, performs down-converting (i.e. converting the mixed signal to have an intermediate frequency) and amplification, and outputs the converted and amplified signal to the demodulator 122. Here, the signal output to the demodulator 122 is a filtered quadrature phase shift keying (QPSK) modulation signal or octal phase shift keying (8PSK) modulation signal.

The demodulator 122 demodulates a digital broadcast single of a tuned channel and outputs a signal in the form of a transport stream (TS). The demodulator 122 may for example receive signals of I and Q channels as a QPSK modulation signal, i.e. IP, IN, QP and QN signals, and demodulate them, thereby outputting a TS signal.

The broadcast signal receiving apparatus 100 according to an exemplary embodiment may include the tuner module 120 where the RF tuner 121 and the demodulator 122 are integrated into one. The tuner module 120, achieved by such a single element, for example a single chip, is mounted to a multi-layer printed circuit board 500 provided inside the broadcast signal receiving apparatus 100, and receives a broadcast signal from the low noise amplifier 112.

Alternatively, the RF tuner 121 and the demodulator 122 according to an exemplary embodiment may be respectively provided as a tuner chip and a demodulator chip, and thus the two chips are mounted to the multi-layer PCB 500.

The signal processor 130 performs various video/audio processing processes previously set with regard to a broadcast signal received through the tuner module 120. The signal processor 130 sends an output signal generated or combined by performing the video processing processes to the display 140, so that the display 140 can display an image and output a sound corresponding to the broadcast signal.

As shown in FIG. 6, the signal processor 130 includes a demultiplexer 131 that demultiplexes a broadcast signal into signals according to characteristics, such as an image signal, an audio signal, and various additional data; a decoder 132 that decodes the TS signal according to video formats of the broadcast signal receiving apparatus 100; and a scaler 133 that adjusts the broadcast signal according to output scales of the display 140. In this exemplary embodiment, the decoder 132 may be for example achieved by a moving picture experts group (MPEG) decoder.

The kind of video processing processes performed by the signal processor 130 is not limited to those shown in FIG. 6 and may for example include de-interlacing for converting an interlaced type into a progressive type, noise reduction for improving image quality, detail enhancement, frame refresh rate conversion, etc.

The signal processor 130 may be achieved by an individual group for independently performing each of the processes, or may be achieved by a system-on-chip (SoC) where various functions corresponding to such processes are integrated. That is, the signal processor 130 in this exemplary embodiment may include a main SoC mounted to the multi-layer PCB 500 provided inside the broadcast signal receiving apparatus 100, in which the main SoC may include at least one processor that realizes the controller 170 to be described later. In this case, the broadcast signal receiving apparatus 100 includes a PCB mounted with a tuner chip corresponding to the tuner module 120 and the main SoC.

The broadcast signal processed by the signal processor 130 is output to the display 140. The display 140 displays an image based on the broadcast signal received from the signal processor 130.

In this exemplary embodiment, the display 140 may for example be achieved by liquid crystal, plasma, a light emitting diode (LED), an organic light-emitting diode (OLED), a surface-conduction electron-emitter, a carbon nano-tube (CNT), nano-crystal, or the like various displays, without limitation.

Further, the display 140 may include additional elements in accordance with its types. For example, if the display 140 is achieved by the liquid crystal, the display 140 includes a liquid crystal display (LCD) panel, a backlight unit for supplying light to the LCD panel, and a panel driver (not shown) for driving the panel.

In this exemplary embodiment, the display 140 may include a touch screen may include a touch screen for receiving input corresponding to a user's touch. The touch screen may be for example achieved by a resistive type, a capacitive type, an infrared type or an acoustic wave type.

The touch screen may display an object (e.g., a menu, a text, an image, a moving image, a figure, an icon and a shortcut icon) including various menu items as a user interface (UI). Thus, a user touches the object displayed on the touch screen with his/her body (e.g., a finger) or a separate pointing device such as a stylus, thereby performing his/her input.

The touch screen may provide a user with a UI corresponding to various services (e.g., a phone call, data transmission, broadcasting, photographing, a moving image or an application). The touch screen sends the controller 170 an analog signal corresponding to a single or multi touch input corresponding to selection on the UI. Here, the touch input includes drag, flick, drag & drop, tap, long tap, etc.

FIG. 6 shows an example that the broadcast signal receiving apparatus 100 is a television and the like display apparatus and includes a display 140. Alternatively, the broadcast signal receiving apparatus 100 according to an exemplary embodiment may be achieved by a set-top box. In this alternative case, the broadcast signal processed by the signal processor 130 is output to and then displayed as an image on a separate display apparatus 102 (see FIG. 1).

If the broadcast signal receiving apparatus 100 is the set-top box, the broadcast signal receiving apparatus 100 may further include an audio/video (A/V) output for outputting a video or audio signal processed by the signal processor 130 to the display apparatus 102 (see FIG. 1) connected by a data communication cable such as a D-sub cable. The A/V output is connected to an A/V input of the display apparatus 102 and transmits the video/audio signal.

The user input interface 150 shown in FIG. 6 sends various preset control commands or limitless information to the controller 170 in response to a user's control and input.

In this exemplary embodiment, the user input interface 150 may include a keypad (or an input panel) with a power key, numeral keys, menu keys or the like buttons provided in a main body of the broadcast signal receiving apparatus 100; a remote controller that generates a preset command/data/information/signal for remotely controlling the broadcast signal receiving apparatus 100 and transmits it to the broadcast signal receiving apparatus 100 or the display apparatus 200; a keyboard; a mouse; or the like peripheral input device separated from the main body, thereby receiving a user's input. The remote controller may further include a touch sensor for sensing a user's touch and a motion sensor for sensing its own motion caused by a user.

The input device is an external device capable of wirelessly communicating with the main body of the broadcast signal receiving apparatus 100, and the wireless communication includes Bluetooth, infrared communication, radio frequency (RF) communication, wireless local area network (LAN), Wi-Fi direct, etc. The input device is controlled by a user and thus transmits a preset command to the broadcast signal receiving apparatus 100.

The keypad includes a physical keypad formed in front and/or lateral sides of the broadcast signal receiving apparatus 100, a virtual keypad displayed on the display 140, and a wirelessly connectable physical keypad. It will be easily appreciated by those skilled in the art that the physical keypad formed in front and/or lateral sides of the broadcast signal receiving apparatus 100 may be excluded in accordance with the performance or structure of the broadcast signal receiving apparatus 100.

The storage 160 stores limitless data under control of the controller 170. The storage 160 may include a nonvolatile memory, a volatile memory, a flash memory, a hard disk drive (HDD) or a solid state drive (SSD). The storage 160 is accessed by the controller 170, and performs reading/recording/ modifying/ deleting/ updating/ and the like with regard to data under control of the controller 170.

The data stored in the storage 160 may for example includes not only an operating system for driving the broadcast signal receiving apparatus 100, but also various applications, image data, additional data, etc. executable on this operating system.

Specifically, the storage 160 may store a signal or data input/output corresponding to operations of the respective elements 110 to 170 under control of the controller 170. The storage 160 may store a graphic user interface (GUI) related to a control program for controlling the broadcast signal receiving apparatus 100 and an application provided by a manufacturer or downloaded from the outside, images for providing the GUI, user information, a document, a database, or related data.

According to an exemplary embodiment, the term of 'storage' refers to the storage 160, a read only memory (ROM) in the controller 170, a random access memory (RAM) or a memory card (for example, a micro SD card, a memory stick, etc.) mounted to the broadcast signal receiving apparatus 100.

The controller 170 performs control with regard various elements of the broadcast signal receiving apparatus 100. Specifically, the controller 170 controls the general operations of the broadcast signal receiving apparatus 100 and signal flow between internal elements 110 to 160 of the broadcast signal receiving apparatus 100 and processes data. For example, the controller 170 performs reception/division/video processing process for a broadcast signal to be processed by the receiving module 110, the tuner module 120 and the signal processor 130, and performs control operations corresponding to a command from the user input interface 150 including an input device, thereby controlling general operations of the broadcast signal receiving apparatus 100.

The controller 170 controls power supplied from a power supply to the internal elements 110 to 160. If there is a user's input or if a previously set and stored condition is satisfied, the controller 170 may perform an operating system (OS) and various applications stored in the storage 160.

The controller 170 may include at least one processor; a nonvolatile memory, i.e. a read only memory in which a control program for controlling the broadcast signal receiving apparatus 100 is stored; and a volatile memory, i.e. a random access memory (RAM) which stores a signal or data received from the exterior of the broadcast signal receiving apparatus 100, or is used as a storage area for various jobs implemented in the broadcast signal receiving apparatus 100. The processor loads a program from the ROM to the RAM to thereby execute the program.

According to an exemplary embodiment, the controller 170 is achieved by at least one universal processor such as a central processing unit (CPU), an application processor (NP), a microcomputer (MICOM), etc. For example, the controller 170 loads a program into the RAM in accordance with a predetermined algorithm stored in the ROM, and executes the program, thereby controlling the broadcast signal receiving apparatus 100 to do various operations.

If the controller 170 of the broadcast signal receiving apparatus 100 is achieved by a single processor, e.g. The CPU, the CPU may be provided to implement various functions of the broadcast signal receiving apparatus 100, for example, to control various video processing processes such as decoding, demodulating, scaling, etc. with regard to an image displayed on the display 140, in response to a user command received through the user input interface 150 including the input device, wired/wireless network communication with the external device through the communication module, and so on.

The processor may include single-core, dual-core, triple-core, quad-core and the multiple-core. The processor may include a plurality of processors, for example, a main processor and a sub processor operating in a sleep mode where the display apparatus is idle with only standby power. Further, the processor, the ROM and the RAM are connected to one another by an internal bus.

According to an exemplary embodiment, if the broadcast signal receiving apparatus 100 is a monitor, the controller 170 may further include a graphic processing unit (GPU) for graphing processing.

Alternatively, if the broadcast signal receiving apparatus 100 is a digital TV, a smart phone or a smart pad, the processor may for example include a GPU in the form of system on chip (SoC) where the core and the GPU are combined.

According to another exemplary embodiment, the controller 170 may include a chip, e.g. an integrated chip (IC) as a program and a dedicated processor for executing the program to perform a certain function supported in the broadcast signal receiving apparatus 100, for example, to process the broadcast signal received in response to the channel selection.

As an example of the controller 170 in this exemplary embodiment, the processor may be included in the main SoC mounted to the multi-layer PCB 500 provided inside the broadcast signal receiving apparatus 100. The main SoC may further include the signal processor 130 to process the broadcast signal to be displayed as an image.

Figure 7:
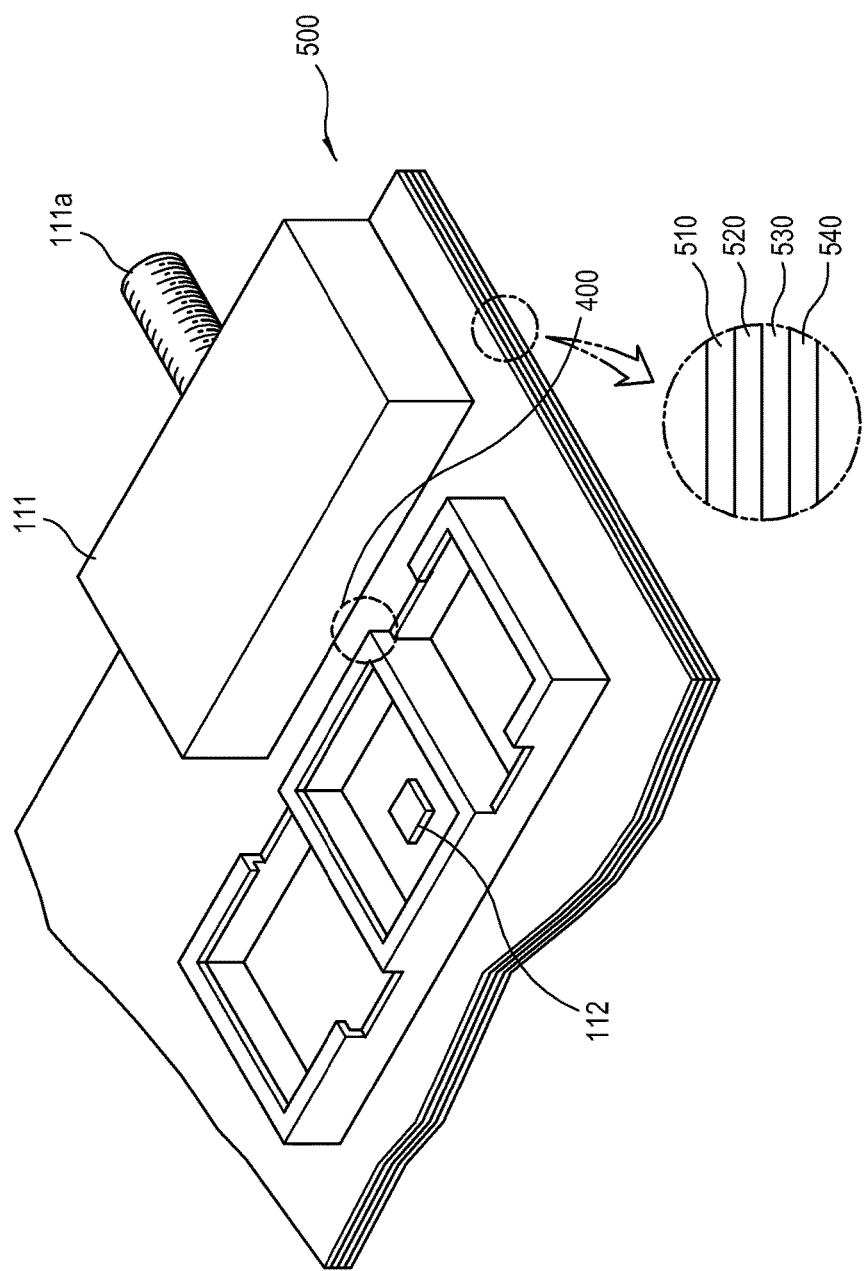
FIG. 7 is a perspective view of a multi-layer printed circuit board provided inside the broadcast signal receiving apparatus according to an exemplary embodiment.
Figure 8:
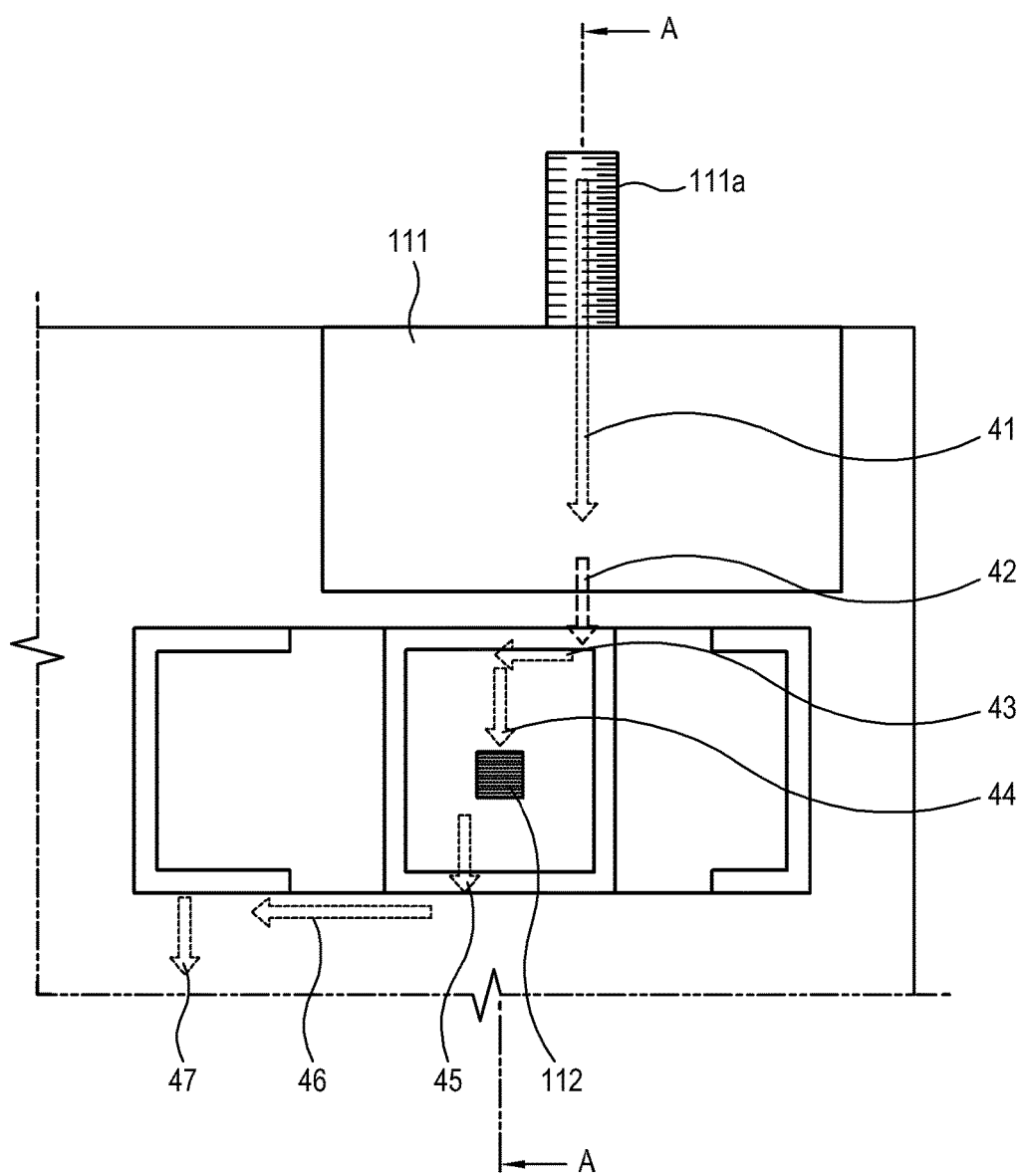
FIG. 8 is a plan view of the multi-layer printed circuit board of FIG. 7, according to an exemplary embodiment.
Figure 9:
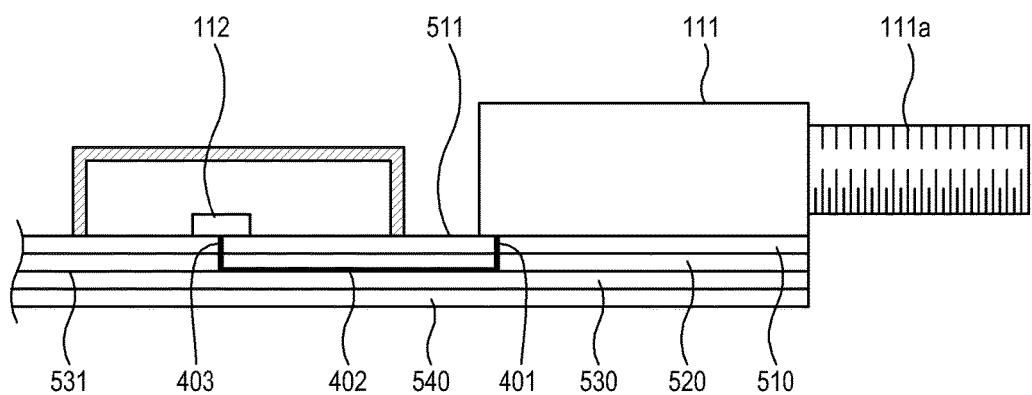
FIG. 9 is a cross-section view of the multi-layer printed circuit board of FIG. 8 taken along line A-A', according to an exemplary embodiment.

FIG. 7 is a perspective view of a multi-layer printed circuit board 500 provided inside the broadcast signal receiving apparatus 100 according to an exemplary embodiment, FIG. 8 is a plan view of the multi-layer printed circuit board 500 of FIG. 7, and FIG. 9 is a cross-section view of the multi-layer printed circuit board 500 of FIG. 8 taken along line A-A'.

As shown in FIG. 7 and FIG. 8, the printed circuit board, i.e. the PCB 500 provided inside the broadcast signal receiving apparatus 100 according to an exemplary embodiment is mounted with at least one component for processing a broadcast signal received from the outside through a cable. FIG. 7 and FIG. 8 illustrate that chips respectively corresponding to the filter 111 and the low noise amplifier, i.e. LNA 122 are mounted as components on the PCB 500.

As shown in FIG. 7 and FIG. 9, the PCB 500 in this exemplary embodiment may be achieved by a printed circuit board having a multi-layered structure. The multi-layer printed circuit board 500 is formed in such a manner than complicated circuits are printed being distributed to many layers and then the layers are stacked.

Here, each layer of the multi-layer printed circuit board 500 may for example have a thickness of 0.4 mm, and a total of the printed circuit board 500 may have a thickness of 1.6 mm.

The multi-layer printed circuit board 500 is mounted with components 111 and 112 for processing a broadcast signal received from the exterior through the cable, and includes transmission lines 401, 402 and 403 for electrically connecting the mounted components 111 and 112. The transmission lines 401, 402 and 403 may include the signal line formed on a surface of a certain layer, and holes (for example, a through-hole or a via-hole) 401 and 402 formed penetrating the plurality of layers.

FIG. 7 to FIG. 9 illustrate an example that the multi-layer printed circuit board 500 has the multi-layered structure of the first to fourth layers 510, 520, 530 and 540. Here, the first layer 510 and the fourth layer 540 correspond to outer layers, and the second layer 520 and the third layer 530 correspond to inner layers.

The topmost layer, i.e. the first layer 510 is mounted with various components such as the filter 111 and the LNA 112 on a surface 511 thereof.

The filter 111 includes an input terminal 111a to connect and couple with the cable terminal in which a broadcast signal is received. Thus, the broadcast signal output from the signal source is received in the broadcast signal receiving apparatus 100 through the cable. Specifically, the broadcast signal 41 is input to the filter 111 as shown in FIG. 8.

The broadcast signal 41 input to the filter 111 is filtered to correspond to a certain frequency band and then sent to the LNA 112. FIG. 8 illustrates paths 41, 42, 43, 44, 45, 46 and 47 along which the broadcast signal passed through the filter 111 and the LNA 112 is transmitted to the tuner module 120 in sequence.

The filter 111 and the LNA 112 are electrically connected by the transmission lines 401, 402 and 403 of FIG. 9, so that a broadcast signal can be transmitted from the filter 111 to the LNA 112 through the corresponding transmission lines 401, 402 and 403.

According to an exemplary embodiment, the signal line 402 for delivering a broadcast signal is formed on the inner layer, for example, a surface 531 of the third layer 530 of the multi-layer printed circuit board 500 as shown in FIG. 9. The signal line 402 serves as the signal input portion, i.e., the entrance of the input signal via which a broadcast signal is input from the outside into the multi-layer printed circuit board 500.

The signal line 402 corresponding to the signal input portion is provided on the inner layer of the multi-layer printed circuit board 500, and thus the first layer 510 has no separate signal line in a portion 400 between the filter 111 and the LNA 112 as shown in FIG. 7.

Figure 10:
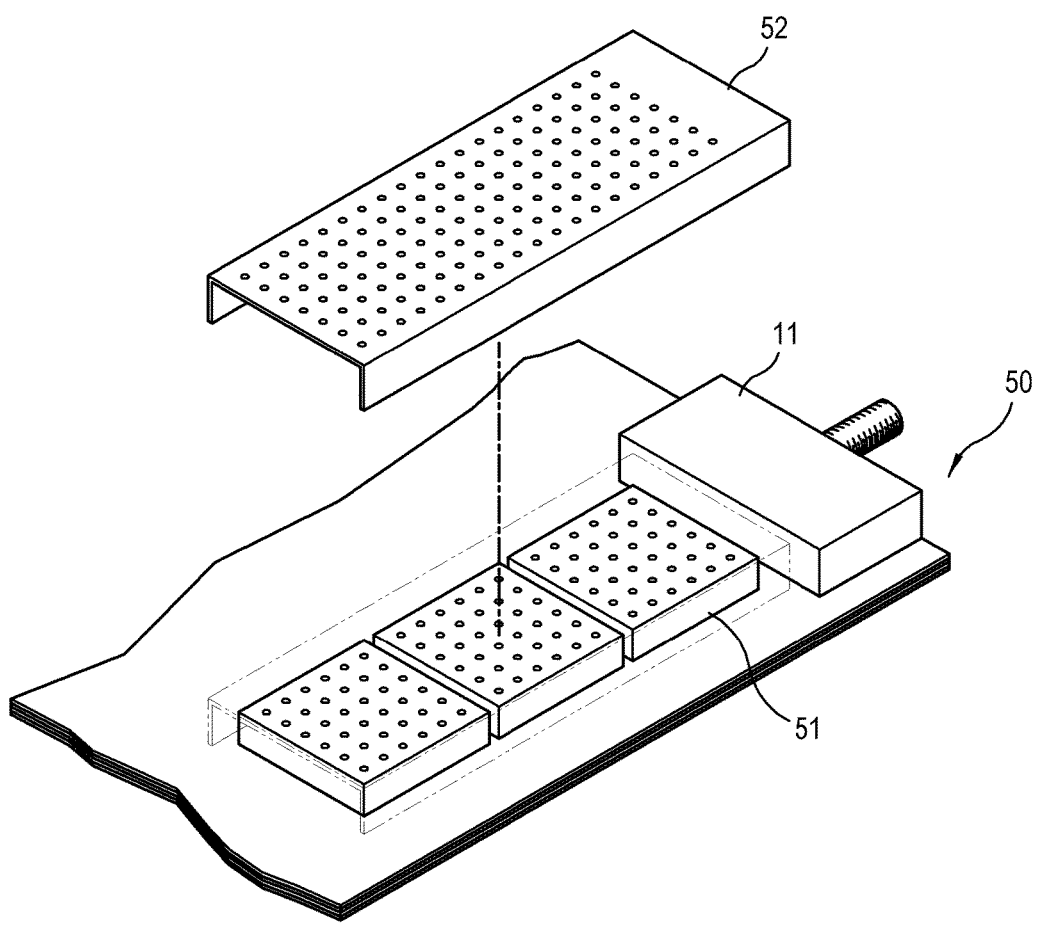
FIG. 10 is a perspective view of a multi-layer printed circuit board where a signal line corresponding to a conventional signal input portion is designed on an outer layer.

FIG. 10 is a perspective view of a multi-layer printed circuit board 50 where a signal line corresponding to a conventional signal input portion is designed on an outer layer.

In the conventional multi-layer printed circuit board 50 shown in FIG. 10, the signal line of the signal input portion connecting the filter 11 and the LNA is formed on the surface of the outer layer of the multi-layer printed circuit board 50, i.e. the topmost first layer to which the components 11 are mounted.

If the signal line of the signal input portion is formed on the first layer of the signal line, a broadcast signal may be distorted by interference with a wireless signal used in the external terminal 201, 202 (see FIG. 1 and FIG. 2). In this regard, the multi-layer printed circuit board 50 may use shields 51 and 52 in order to mechanically shield an interference signal. FIG. 10 shows an example that a shield 51 for primarily shielding the LNA and the signal line of the outer layer connected to the LNA and a shield 52 for secondarily shielding them are installed to the multi-layer printed circuit board 50.

On the other hand, in the multi-layer printed circuit board 500 according to an exemplary embodiment shown in FIG. 7 to FIG. 9, the inner layer 530 formed with the signal line 402 mechanically surrounded with the outer layers 510 and 540 and the inner layer 520 where the signal line 402 is not formed cause a shielding effect without any separate shield.

Thus, in the multi-layer printed circuit board 500 according to an exemplary embodiment, the signal line 402 corresponding to the signal input portion is designed to be formed on the inner layer 530, so that the interference with the external signal can be reduced without any shield.

On the contrary to the conventional structure where the input entrance of the broadcast signal is installed at the PCB outer layer, the broadcast signal receiving apparatus 100 according to an exemplary embodiment has the signal input portion formed on the inner layer to have optimum impedance and the corresponding pattern design, thereby preventing a signal from distortion without increase of costs and shielding an external interference signal.

FIG. 11 to FIG. 14 illustrate the layers 510, 520, 530 and 540 of the multi-layer printed circuit board 500 according to an exemplary embodiment.

The exemplary embodiment shown in FIG. 11 to FIG. 14 shows that the multi-layer printed circuit board 500 has the structure having the four layers of the first to fourth layers.

Figure 11:
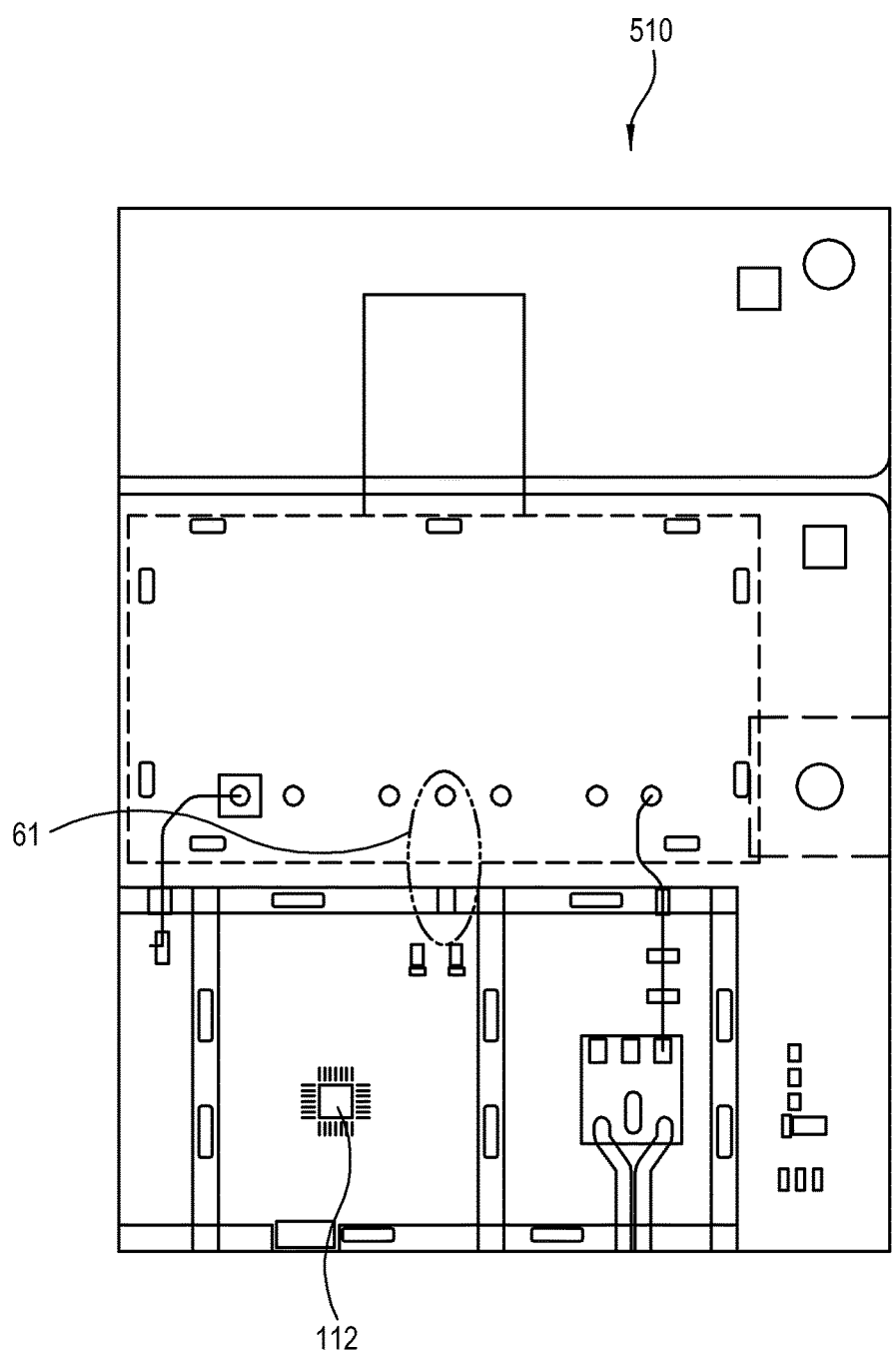
FIG. 11 to FIG. 14 illustrate layers of the multi-layer printed circuit board according to an exemplary embodiment.

As shown in FIG. 11, the topmost first layer 510 is mounted with various components 111 and 112 for processing a broadcast signal. In FIG. 11, a position where the filter 111 is mounted is represented by a dotted line. The first layer 510 may be further mounted with RLC devices for operating a circuit.

Here, the second layer 520 may be a ground layer, the third layer 530 may be a power layer or the ground layer, and the fourth layer 540 may be the power layer.

In the multi-layer printed circuit board 500 according to an exemplary embodiment, the signal line 402 corresponding to the signal input portion may be achieved by the strip line formed on the inner layer of the multi-layer printed circuit board 50, for example, on the surface 531 of the third layer 530.

Referring to FIG. 11 to FIG. 14, the signal line 402 is formed on only the surface 63 corresponding to the third layer 530 (see FIG. 13) among the surfaces 61, 62, 63 and 64 of the layers 510, 520, 530 and 540 between the filter 111 and the LNA 112.

Here, the impedance of the inner layer 530 where the signal line 402 is formed is used as a predetermined reference value determined to reduce the distortion of the broadcast signal due to the interference with the external interference signal having the frequency band overlapped with that of the broadcast signal. This reference value may be determined corresponding to a cable medium through which the broadcast signal is transmitted. Further, a predetermined parameter (e.g. an S-parameter to be described later) measured in the multi-layer printed circuit board 500 desired to have impedance corresponding to the reference value is determined to follow regulations at a predetermined frequency band, for example, to satisfy requirements of a broadcast operator.

Figure 13:
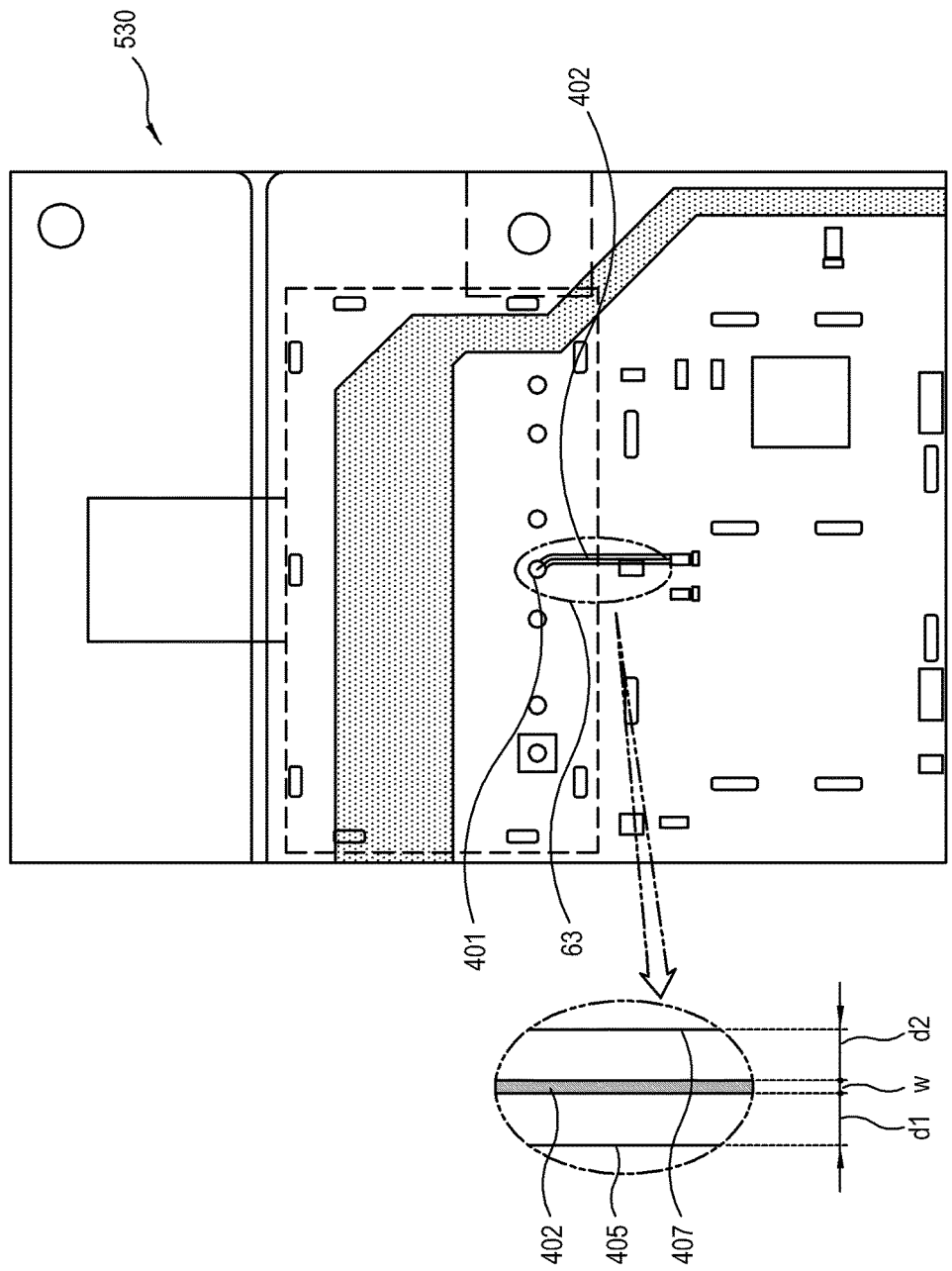
Figure 14:
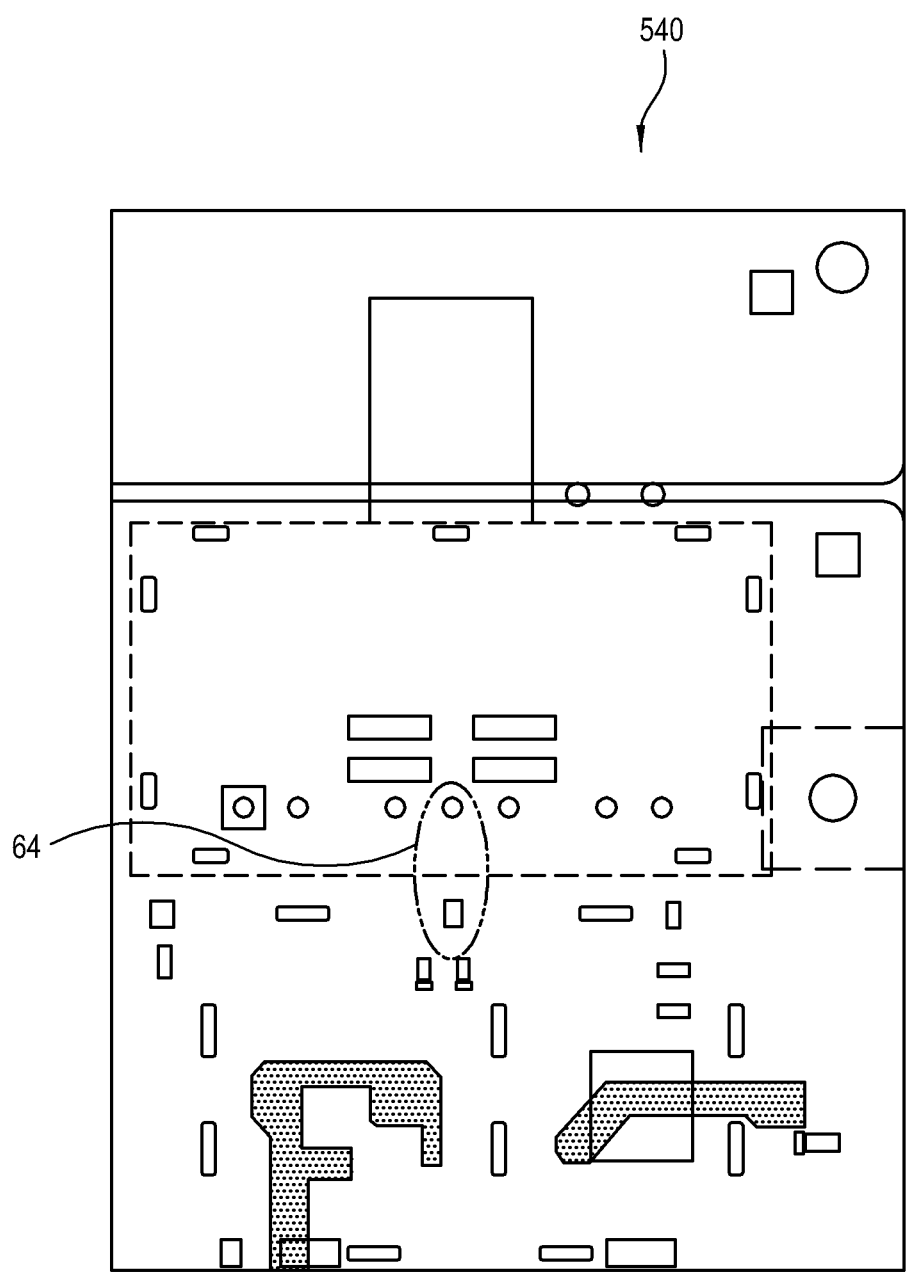

As shown in FIG. 13, the strip line is given in the form of a transmission line 402 where a narrow conductive circuit keeps equal distance from and parallel with two flat ground planes 405 and 407.

The strip line may be formed by a pattern design. For example, a substrate (a copper plate) formed by applying a copper layer to the layer 530, and then copper is selectively removed from an undesired portion of the substrate through a mask by an etching process. That is, a desired copper wiring line is remained as the signal line 402 through the etching process, thereby forming a pattern.

In this manner, as shown in FIG. 13, the signal line 402 corresponding to the signal input portion is patterned on the surface 531 of the third layer 530. For example, the pattern, i.e. the signal line 402 has a thickness w of 0.1 mm, and each of distances d1 and d2 between the pattern and both ground surfaces 405, 407 is 0.5 mm.

Here, the thickness w of the pattern 402 and the distances d1 and d2 from the ground are determined for impedance matching so that the impedance of the inner layer 530 formed with the signal line 402 can have a predetermined reference value.

In this exemplary embodiment, the reference value for the impedance matching is 55Ω by way of example. This reference value may be determined by experiments.

Figure 15:
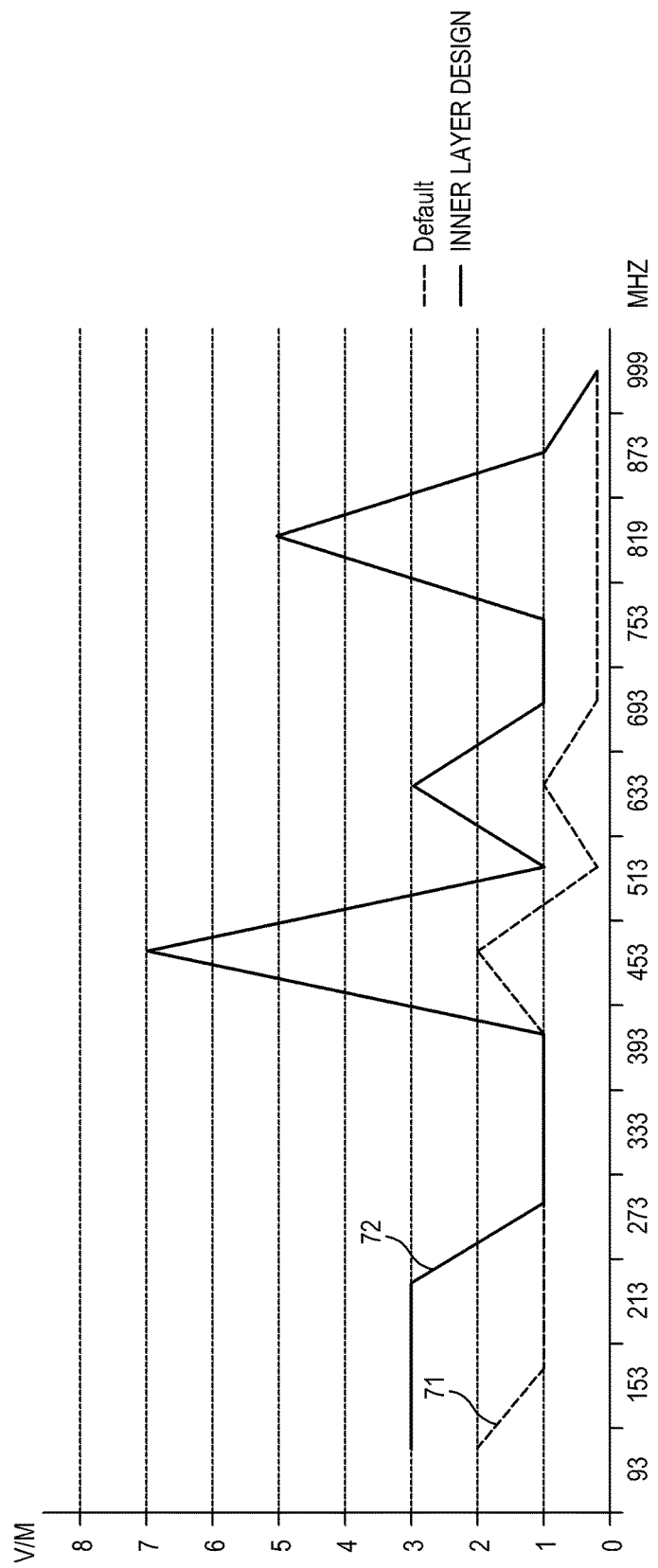
FIG. 15 is a graph for explaining a degree of shielding an external signal in accordance with an inner layer design of the signal input portion according to an exemplary embodiment.
Figure 16:
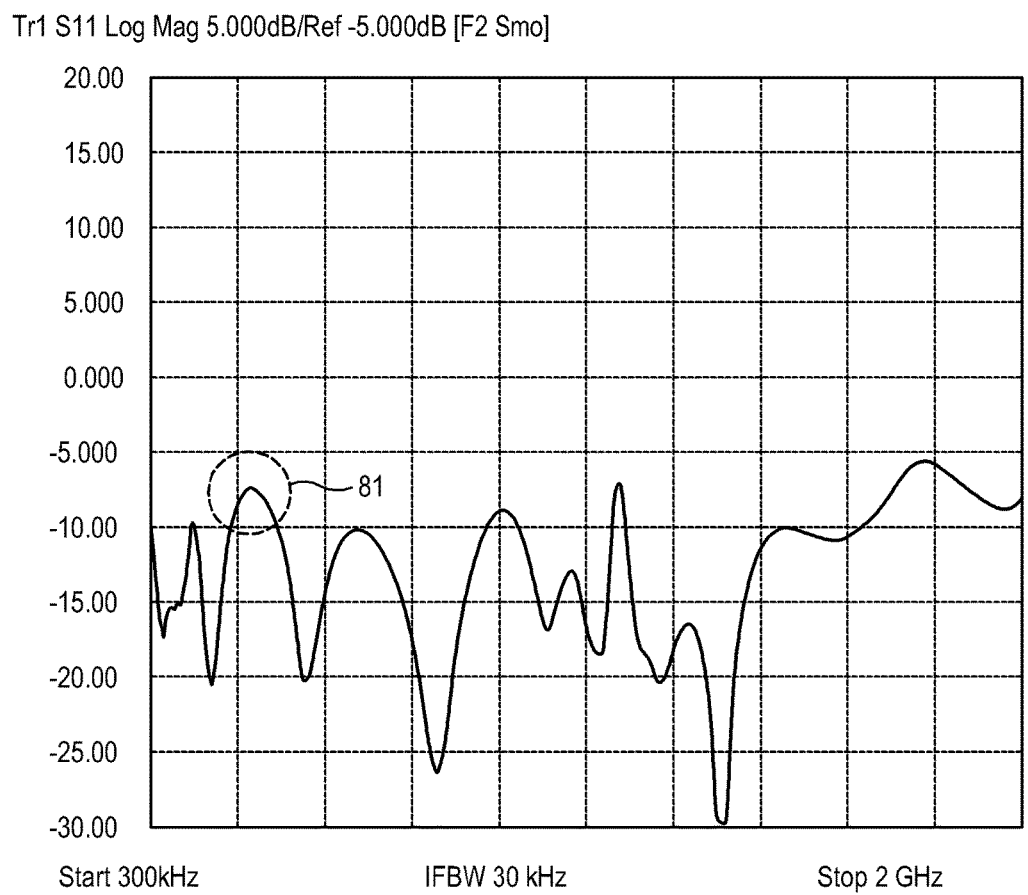
FIG. 16 and FIG. 17 are graphs showing results of when a signal input portion is provided in an inner layer of the multi-layer printed circuit board according to an exemplary embodiment.
Figure 17:
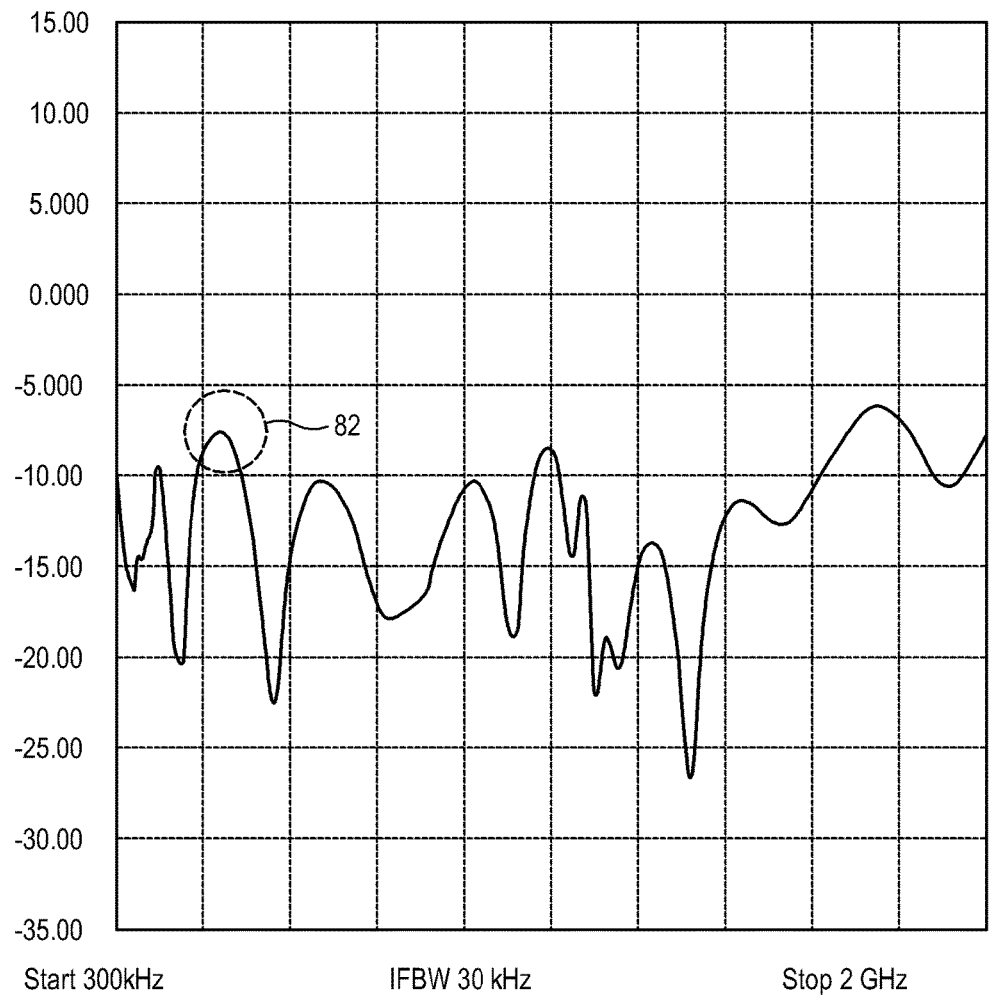

In the multi-layer printed circuit board 500 according to an exemplary embodiment, the signal line 402 corresponding to the signal input portion is formed on the inner layer thereof, and the pattern of the signal line 402 is designed in consideration of the impedance matching to have a predetermined value, thereby decreasing the distortion of the broadcast signal due to interference with the wireless signal of the external terminals 201 and 202. The results are shown in the graphs of FIG. 15 to FIG. 17.

In addition, the first layer 510 of the multi-layer printed circuit board 500 according to the first exemplary embodiment may be mounted with the RLC device for operating the circuit. In this case, impedance matching may be further used to minimize noise generated in the RLC device.

Figure 12:
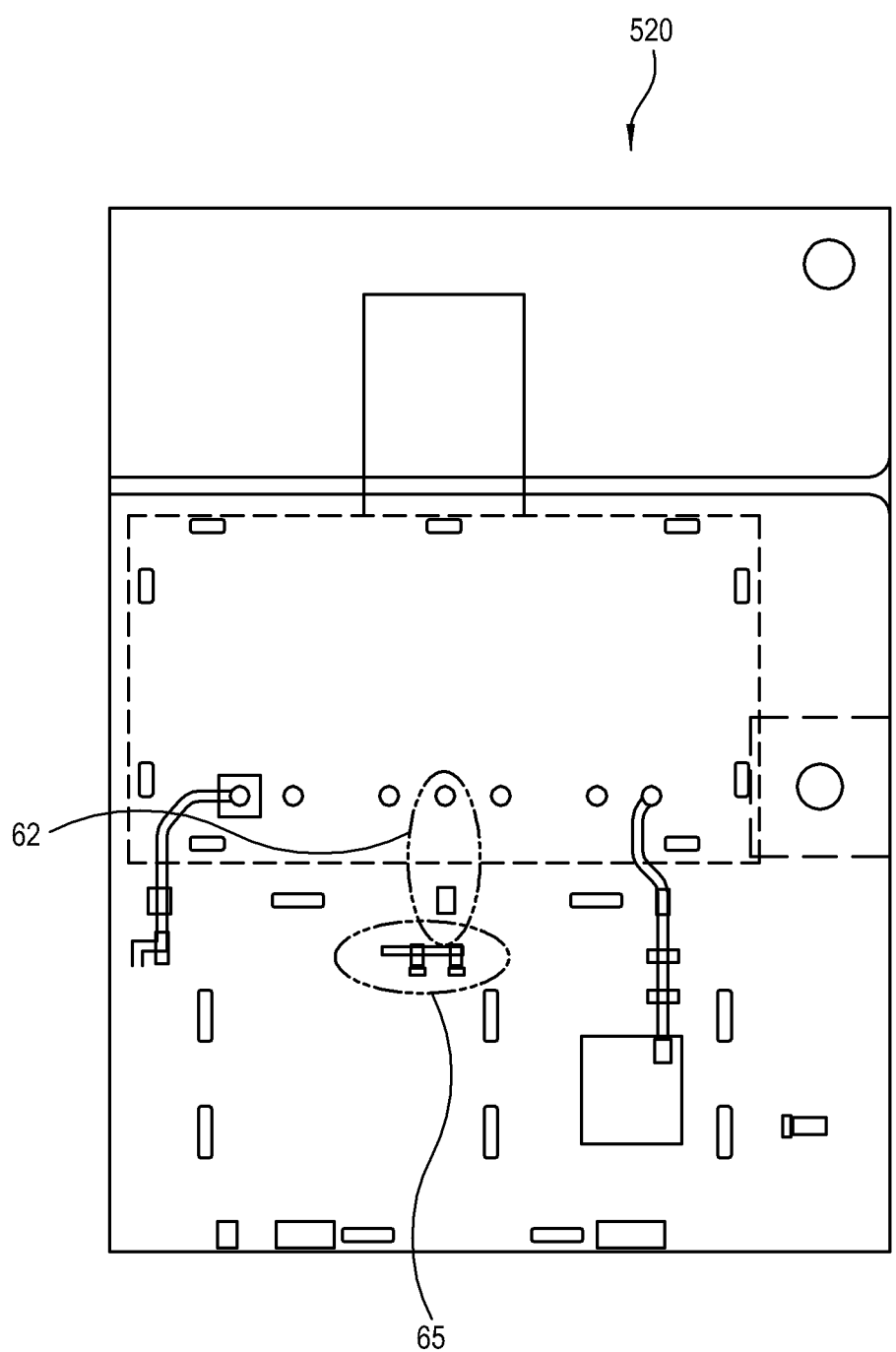

Referring to FIG. 12, a portion 65 of the second layer 520 corresponding to a position where the RLC device is mounted may be removed by etching, and a pattern may be designed to have an impedance of 75Ω with respect to the third layer 530 after removing the portion 65 of the second layer 520. Here, it may be designed that the pattern has a thickness of 0.3048 mm and each of distances between the pattern and both ground surfaces is 0.2286 mm. This impedance may be determined by experiments.

In the exemplary embodiments shown in FIG. 7 to FIG. 9 and FIG. 11 to FIG. 14, the signal line 402 corresponding to the signal input portion is provided on the third layer 530 of the multi-layer printed circuit board 500, but not limited thereto. Alternatively, the signal line corresponding to the signal input portion may be provided on another inner layer, e.g. the second layer 520. If the pattern corresponding to the signal line is formed on the surface of the second layer 520, the first layer 510, the third layer 530 and the fourth layer 540 serve to shield the external interference signal.

In the exemplary embodiments shown in FIG. 7 to FIG. 9 and FIG. 11 to FIG. 14, the multi-layer printed circuit board 500 has the structure where the first to fourth layers 510, 520, 530 and 540 are stacked, but not limited thereto. For example, the multi-layer printed circuit board 500 may be achieved by a six-layered PCB where the first to six layers are stacked. In this case, the signal line corresponding to the signal input portion may be provided on one of the inner layers of the PCB, i.e. one of the second to fourth layers.

FIG. 15 is a graph for explaining a degree of shielding an external signal in accordance with an inner layer design of the signal input portion according to an exemplary embodiment.

Specifically, FIG. 15 shows that values of S-parameter specified by a degree of reflecting a signal are connected under a default environments and an input inner-layer design environment according to the exemplary embodiments. In FIG. 15, the values 71 measured according to frequencies in the default environment are tabulated in the following table 1, and values 72 measured according to frequencies according to the exemplary embodiment are tabulated in the following table 2.

TABLE 1

| | Freq. (MHz) | | | | | | | | | | | | | | |
|---|---|---|---|---|---|---|---|---|---|---|---|---|---|---|---|
| | 93 | 153 | 213 | 273 | 333 | 393 | 453 | 513 | 633 | 693 | 753 | 819 | 873 | 999 | Average |
| Antenna V/m | V 2 | V 1 | V 0.5 | V 0.2 | V 1 | V 1 | V 0.2 | V 0.2 | V 0.5 | V 0.5 | V 0.2 | V 0.2 | V 0.2 | V 0.2 | V 0.5643 |
| Antenna V/m | H 2 | H 1 | H 1 | H 1 | H 1 | H 1 | H 2 | H 0.2 | H 1 | H 0.2 | H 0.2 | H 0.2 | H 0.2 | H 0.2 | H 0.8 |

TABLE 2

| | Freq. (MHz) | | | | | | | | | | | | | | |
|---|---|---|---|---|---|---|---|---|---|---|---|---|---|---|---|
| | 93 | 153 | 213 | 273 | 333 | 393 | 453 | 513 | 633 | 693 | 753 | 819 | 873 | 999 | Average |
| Antenna V/m | V 3 | V 3 | V 3 | V 2 | V 1 | V 2 | V 1 | V 1 | V 1 | V 1 | V 1 | V 1 | V 1 | V 5 | V 1.8571 |
| Antenna V/m | H 3 | H 3 | H 3 | H 1 | H 1 | H 1 | H 7 | H 1 | H 3 | H 1 | H 1 | H 5 | H 1 | H 0.2 | H 2.2286 |

Here, averages of S-parameter values are 0.8 V/m in the table 1 and 2.2 V/m in the table 2. In such a case that the signal line 402 was provided on the inner layer 530 and the impedance was designed to have 55Ω according to an exemplary embodiment, the effect on shielding the external signal was increased by 10 dB.

Figure 18:
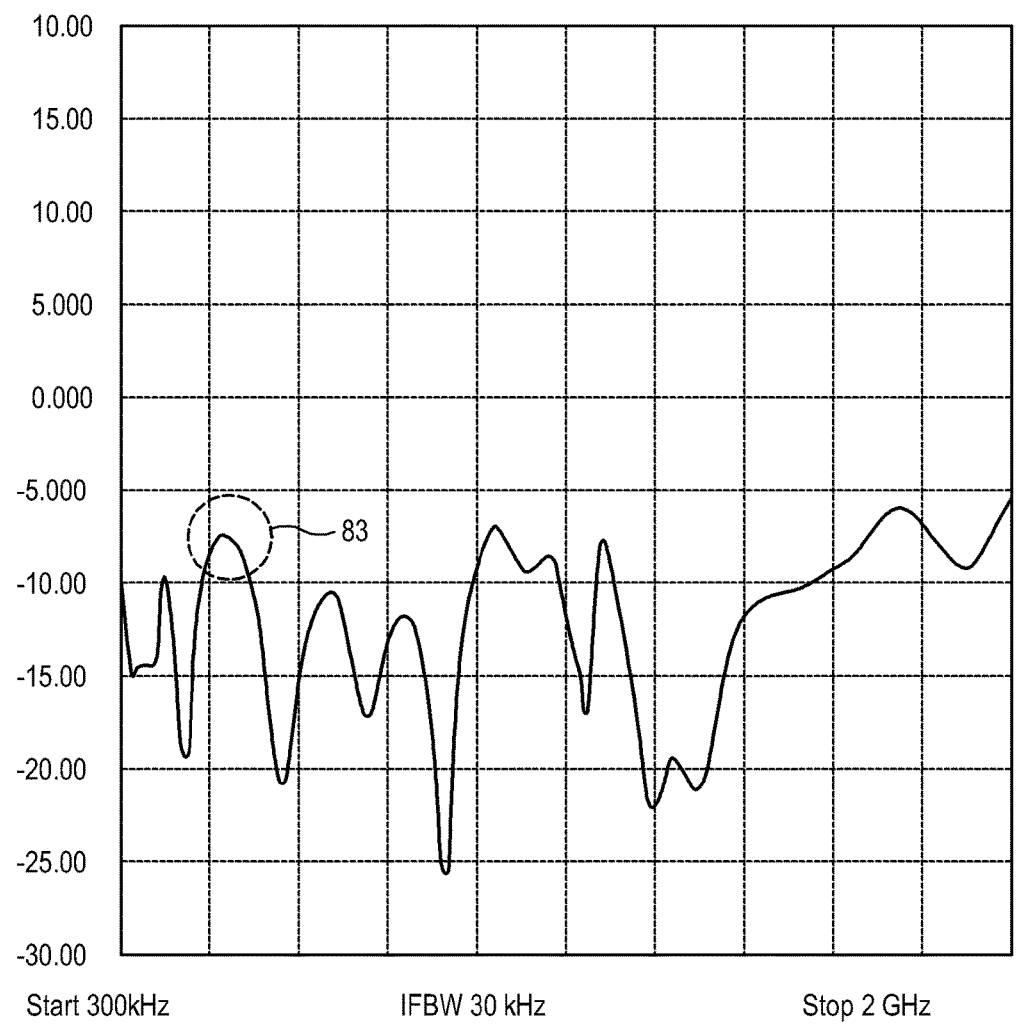
FIG. 18 is a graph showing results of when a shield is added to the structure that the signal input portion is provided in the outer layer of the conventional multi-layer printed circuit board under the condition of FIG. 17, according to an exemplary embodiment.

FIG. 16 and FIG. 17 are graphs of showing results of when a signal input portion is provided in an inner layer of the multi-layer printed circuit board 500 according to an exemplary embodiment, and impedances are matched, and FIG. 18 is a graph of showing results of when a shield is added to the structure that the signal input portion is provided in the outer layer of the conventional multi-layer printed circuit board under the condition of FIG. 17.

In the multi-layer printed circuit board 500 according to an exemplary embodiment, the S-parameter specified by a degree of reflecting a signal is measured to determine whether the signal is distorted or not. FIG. 16 to FIG. 18 shows the S-parameters measured in the respective cases.

In this exemplary embodiment, the magnitude of the S-parameter measured in the multi-layer printed circuit board 500 designed to have impedance corresponding to the reference value of 55Ω is determined to follow the regulations at a predetermined frequency band (about 230 MHz), for example, to satisfy business requirements.

FIG. 16 shows that the magnitude of the S-parameter measured when the inner layer is designed to have the impedance of 55Ω is represented by a dB scale, in which a return loss 81 measured at the frequency band of 230 MHz satisfies −7.5 dB. Thus, it is possible to satisfy the business requirements without any separate trade off.

Likewise, a return loss 82 of FIG. 17 measured at the frequency band of 230 MHz also satisfies 31 7.X dB.

FIG. 18 shows that the magnitude of the S-parameter measured when the signal input portion is provided on the outer layer under the same condition as that of FIG. 17 is represented by a dB scale, in which a return loss 83 measured at a similar frequency band of 240 MHz satisfies −7.X dB.

In result, referring to FIG. 16 to FIG. 18, there is little difference in performance of delivering a broadcast signal between when the signal line 402 corresponding to the signal input portion is provided on the inner layer 530 of the multi-layer printed circuit board 500 according to an exemplary embodiment and patterned so that the inner layer can have a reference impedance (e.g. 55Ω), and when the signal input portion is provided on the outer layer 510 of the conventional multi-layer printed circuit board 50 and shielded by the shield.

Thus, according to the foregoing exemplary embodiments, the signal line 402 corresponding to the signal input portion is provided on the inner layer 520, 530 in the multi-layer printed circuit board 500 placed inside the broadcast signal receiving apparatus 100, and impedance is designed to match with a predetermined reference value, so that signal distortion of a broadcast signal due to interference with an ambient wireless signal having a frequency band overlapped with that of the broadcast signal can be decreased without adding any separate shielding structure.

Like this, the signal distortion due to ambient interference signals is minimized, thereby preventing the reception sensitivity of the broadcast signal from becoming poor or image/sound qualities from being deteriorated.

Further, the foremost signal line for receiving a broadcast signal is provided on the inner layer of the multi-layer printed circuit board, so that the outer layer and the inner layer were the signal line is not provided can serve to shield an external interference signal.

Further, the signal line corresponding to the signal input portion is provided on the inner layer by a pattern design for impedance matching, and it is easy to design the pattern to maximize the shielding effect so that an effect on preventing signal distortion by a process can be expected.

Accordingly, costs as compared with the conventional case where the signal input portion is provided on the outer layer and the external signal is shielded by the mechanical shield, it is possible to improve the performance of the multi-layer printed circuit board by only design modification without adding a special process or increasing material.

Although a few exemplary embodiments have been shown and described, it will be appreciated by those skilled in the art that changes may be made in these exemplary embodiments without departing from the scope defined in the appended claims and their equivalents.

What is claimed is:

1. A broadcast signal receiving apparatus comprising:
   a multi-layer printed circuit board comprising a transmission line configured to connect with at least one component mounted on the multi-layer printed circuit board, the at least one component being configured to process a broadcast signal received from an outside of the apparatus through a cable,
   wherein a signal line for receiving the broadcast signal is at least partially provided on an inner layer of the multi-layer printed circuit board,
   wherein an impedance of the inner layer where the signal line is provided is a predetermined reference value configured to decrease distortion of the broadcast signal due to interference with an external signal.

2. The broadcast signal receiving apparatus according to claim 1, wherein the external signal is configured to have a frequency band overlapped with a frequency band of the broadcast signal.

3. The broadcast signal receiving apparatus according to claim 1, wherein the reference value is determined so that a magnitude of a predetermined parameter measured in the multi-layer printed circuit board configured to have impedance corresponding to the reference value satisfies regulations at a predetermined frequency band.

4. The broadcast signal receiving apparatus according to claim 1, wherein the signal line is formed as a pattern on the inner layer of the multi-layer printed circuit board, and a thickness of the pattern and a distance between the pattern and both ground surfaces are configured so that the impedance of the inner layer corresponds to the reference value.

5. The broadcast signal receiving apparatus according to claim 1, wherein the multi-layer printed circuit board is configured to have a multi-layered structure comprising first to fourth layers, and
   the signal line corresponding to a signal input portion is provided on one from among a second layer and a third layer of the multi-layer printed circuit board.

6. The broadcast signal receiving apparatus according to claim 1, wherein the multi-layer printed circuit board is configured to have a multi-layered structure comprising first to sixth layers, and
   the signal line corresponding to a signal input portion is provided on one from among a second layer and a fourth layer of the multi-layer printed circuit board.

7. The broadcast signal receiving apparatus according to claim 1, wherein the signal line is shielded from an external interference signal by an outer layer and by a portion of the inner layer where the signal line is not provided.

8. The broadcast signal receiving apparatus according to claim 1, further comprising:
   a filter configured to filter the broadcast signal received from the outside of the apparatus through the cable; and
   a low noise amplifier configured to amplify the filtered broadcast signal,
   wherein the filtered broadcast signal is input to the low noise amplifier through the signal line provided on the inner layer.

9. The broadcast signal receiving apparatus according to claim 1, wherein the inner layer comprises one from among a ground layer or a power layer.

10. A multi-layer printed circuit board inside a broadcast signal receiving apparatus, the multi-layer printed circuit board comprising:
    a transmission line configured to connect with at least one component mounted on a topmost layer of the multi-layer printed circuit board, the at least one component being configured to process a broadcast signal received from an outside of the apparatus through a cable,
    wherein a signal line for receiving the broadcast signal is at least partially provided on an inner layer of the multi-layer printed circuit board, wherein an impedance of the inner layer where the signal line is provided is a predetermined reference value configured to decrease distortion of the broadcast signal due to interference with an external signal.

11. The multi-layer printed circuit board according to claim 10, wherein the external signal is configured to have a frequency band overlapped with a frequency band of the broadcast signal.

12. The multi-layer printed circuit board according to claim 10, wherein the reference value is determined so that a magnitude of a predetermined parameter measured in the multi-layer printed circuit board configured to have impedance corresponding to the reference value satisfies regulations at a predetermined frequency band.

13. The multi-layer printed circuit board according to claim 10, wherein the signal line is formed as a pattern on the inner layer of the multi-layer printed circuit board, and a thickness of the pattern and each of a distance between the pattern and both ground surfaces are configured so that the impedance of the inner layer corresponds to the reference value.

14. The multi-layer printed circuit board according to claim 10, wherein the multi-layer printed circuit board is configured to have a multi-layered structure comprising first to fourth layers, and the signal line corresponding to a signal input portion is provided on one from among second layer and a third layer of the multi-layer printed circuit board.

15. The multi-layer printed circuit board according to claim 10, wherein the multi-layer printed circuit board is configured to have a multi-layered structure comprising first to sixth layers, and the signal line corresponding to a signal input portion is provided on one from among a second layer and a fourth layer of the multi-layer printed circuit board.

16. The multi-layer printed circuit board according to claim 10, wherein the signal line is shielded from an external interference signal by an outer layer and by a portion of the inner layer where the signal line is not provided.

17. The multi-layer printed circuit board according to claim 10, further comprising:

a filter configured to filter the broadcast signal received from the outside of the apparatus through the cable; and a low noise amplifier configured to amplify the filtered broadcast signal, wherein the filtered broadcast signal is input to the low noise amplifier through the signal line provided on the inner layer.

18. The multi-layer printed circuit board according to claim 10, wherein the inner layer comprises one from among a ground layer or a power layer.

* * * * *